United States Patent
Sharman et al.

(10) Patent No.: US 7,930,208 B2
(45) Date of Patent: Apr. 19, 2011

(54) METHOD AND SYSTEM FOR DELIVERY OF ADVERTISING CONTENT IN SHORT MESSAGE SERVICE (SMS) MESSAGES

(75) Inventors: Duane R Sharman, Calgary (CA); Ian Cheung, North York (CA); David Cooper, Calgary (CA)

(73) Assignee: Wmode Incorporated, Alberta (CA)

( * ) Notice: Subject to any disclaimer, the term of this patent is extended or adjusted under 35 U.S.C. 154(b) by 484 days.

(21) Appl. No.: 12/079,575

(22) Filed: Mar. 27, 2008

(65) Prior Publication Data

US 2008/0243619 A1  Oct. 2, 2008

Related U.S. Application Data

(60) Provisional application No. 60/920,902, filed on Mar. 30, 2007.

(51) Int. Cl.
*G06Q 40/00* (2006.01)
(52) U.S. Cl. .......................... 705/14; 705/10
(58) Field of Classification Search ............... 705/10–44
See application file for complete search history.

(56) References Cited

U.S. PATENT DOCUMENTS

| | | | | |
|---|---|---|---|---|
| 6,058,308 | A * | 5/2000 | Kallin et al. | 455/432.3 |
| 6,637,257 | B2 * | 10/2003 | Sparks | 73/38 |
| 6,647,257 | B2 * | 11/2003 | Owensby | 455/414.1 |
| 7,010,293 | B2 * | 3/2006 | Go | 455/414.3 |
| 2005/0126345 | A1 * | 6/2005 | Berthiaume | 81/44 |
| 2005/0267809 | A1 * | 12/2005 | Zheng | 705/14 |
| 2006/0282328 | A1 * | 12/2006 | Gerace et al. | 705/14 |

* cited by examiner

*Primary Examiner* — Frantzy Poinvil

(57) ABSTRACT

Methods and apparatus are disclosed for combining advertising messages with short message service (SMS) messages in a wireless communications system. A signaling message processing and routing node transmits and receives short message service (SMS) data packets via a communications network. The routing node includes an SMS message processing module that determines whether an SMS message should be modified to include advertisements. SMS messages, whether modified or left unmodified, are forwarded to a destination mobile communications device. The SMS message processing module applies rules to match selected advertisements with the SMS message. The determination of whether to modify the SMS message to include a selected advertisement is based on a variety of considerations including: the content and format of the SMS message; the content and format of the advertisements; the communications and display characteristics of the destination mobile communications device; and the limitations of the channel used to communicate the message to the destination mobile communications device.

25 Claims, 8 Drawing Sheets

| | DEVICE TYPE | DISPLAY FORMATS | PROTOCOLS | AD SCREEN SIZE | MESSAGE SIZE |
|---|---|---|---|---|---|
| 402 | NOKIA 3234 | TEXT | SMS | 2x20 CHARS | 1600 BYTES |
| 404 | NOKIA 3234 | JPEG | EMS, MMS | 40x100 PIXELS | 200K BYTES |
| 406 | MOTOROLA 123 | TEXT | SMS | 1x16 CHARS | 1600 BYTES |

| PHONE # | RECORD TYPE | KEYWORDS |
|---|---|---|
| 502 — 403 555 1212 | SEARCH | PINK FLOYD |
| 504 — 403 555 1212 | PURCHASE | PINK FLOYD - DARK SIDE OF THE MOON |
| 506 — 403 555 1214 | NAVIGATE | RINGTONE |

508 — RECORD TYPE
510 — KEYWORDS

| | 608 | 610 | 612 | 614 | 616 | 618 |
|---|---|---|---|---|---|---|
| | FORMAT | DISPLAY SIZE | FILE SIZE | ADVERTISING MESSAGE | KEYWORDS | AD VALUE |
| 602 | TEXT | 2x20 CHARS | 40 BYTES | "ringtones<br>www.abc.com" | RINGTONE, ENGLISH | 30 |
| 604 | JPEG | 40x100 PIXELS | 12 KBYTES | <img src="www.abc.com/image.jpg"> | IMAGE, ENGLISH | 80 |
| 606 | HYPERLINK | 2x20 CHARS | 80 BYTES | "ringtones<br> <a href="www.abc.com"> click here</a> | RINGTONE, ENGLISH | 50 |

METHOD AND SYSTEM FOR DELIVERY OF ADVERTISING CONTENT IN SHORT MESSAGE SERVICE (SMS) MESSAGES

CROSS REFERENCE TO RELATED APPLICATIONS

This application claims the benefit of Provisional Application 60/920,902, filed Mar. 30, 2007, which is incorporated by reference herein.

BACKGROUND

1. Field

The disclosed methods and apparatus relate generally to the field of mobile or wireless communications, and more specifically to methods and apparatus for combining advertising messages with short message service (SMS) messages routed to mobile communications devices.

2. Related Art

Since their introduction in the 1980s, wireless networks have evolved from first generation networks, which supported voice communications and only limited data communications, to second generation networks such as GSM and CDMA, which include data communications capabilities, through to third generation networks, which support much higher data bandwidth as required for the distribution of music and video, among other forms of content. Second generation networks introduced Short Message Service (SMS) messaging, which provides for messages to be exchanged between users. SMS messaging was originally provided as a limited form of text messaging. SMS messaging provides a low per-message bandwidth transport, with low bandwidth requirements, and as such is attractive to network operators.

SMS messaging enables mobile subscribers to easily and efficiently transmit and receive text and other media type messages using a wireless device such as a cell phone or other wireless apparatus. This feature of wireless communication systems has grown rapidly during the past few years. Although standards and specifications relating to SMS communication continue to evolve, the most common usage of SMS communication is for the transmission of short text messages between wireless phone users. In this context, an SMS text message is composed using an origination cell phone, transmitted from the origination cell phone to a wireless base station, and subsequently passed through one or more routing nodes before being transmitted to a destination cell phone.

Standards for communication of SMS messages have been developed and continue to evolve, with various standards being applicable to different network components. Standards defining methods of communication between cell phones and base stations prescribe the message formats and communications methods for transmission over radio frequency communications channels. Similarly, communication of SMS messages between base stations and routing nodes, and between routing nodes, are defined in standards for their respective interfaces.

For example, and as described in more detail below, in current implementations, SMS messages are typically transported within the wireless communications network using signaling network elements, rather than through bearer channels. The signaling protocols are subject to standardization, and technical details vary depending on which standards body is responsible. In North American and international wireless networks, "signaling System No. 7" (SS7) signaling protocols and network elements are used to effect the routing of SMS messages. The SS7 signaling protocol is a Telecommunication Industry Standard signaling protocol for use in wireless communication systems. SMS service uses the SS7 mobile application part (MAP), which defines signaling methods for use in wireless networks. The MAP protocol uses the Transaction Capabilities Application Part (TCAP) component of the SS7 protocol. Both international and North American standards bodies have defined a MAP layer using the SS7 TCAP component. The international standard is defined by the European Telecommunication Standards Institute and is referred to as "GSM MAP". The North American standard is published by the Telecommunication Industry Association (TIA) and is referred to as "IS-41 MAP". Both of these standards are incorporated by reference herein as if set forth in full for their teachings on signaling communication methods and protocols.

Many implementations of wireless networks combine multiple functions where possible, and so, for example, the "base station" and "routing node" functions may be combined into a single component. In such cases, the implementation may not adhere to the industry standards, although the functionality is substantially the same.

As wireless technology communication systems and related technologies have evolved, SMS messaging has also evolved in order to provide enhanced and richer content. SMS messages are now being generated using a variety of media-rich sources to provide an enhanced and broader range of communication. As the wireless network and related technologies have evolved, the SMS messaging standards have expanded to incorporate the multimedia formats and enhanced functionality. Mobile communications devices have evolved to include more than wireless phone capability, including a broader range of Internet and e-mail capabilities, together with sophisticated display technology, built-in cameras, and other features and functions.

SMS messages may be generated from a variety of sources. For example, an e-mail message may be generated using a wireline computer terminal residing within a data network (e.g., the Internet) and transmitted to a mobile terminal within a wireless network as an SMS message. SMS messages may also be automatically generated by monitoring systems. For example, security systems may generate SMS messages to notify a user of an alarm. Monitoring of news feeds or traffic reports is often used to automatically generate SMS messages. Multiplayer SMS games have also been developed wherein the SMS messages are automatically generated, for example, as a reaction to other players' actions.

Whether SMS messages are generated by users via a cell phone, through e-mail using a computer, or automatically by monitoring or similar systems, all SMS messages transmitted to a given destination user eventually pass through a common network routing node. Often, the capabilities of the wireless devices and the communications channels offer more flexibility, bandwidth, and performance than what is necessary to deliver and display the SMS messages. This surplus in device and network capabilities has heretofore not been thoroughly exploited to allow for transmission of additional message content, such as advertising and other messaging information.

SMS Message Formats, Enhanced Messaging Services (EMS) and Multimedia Messaging Services (MMS)

SMS messaging was originally designed specifically for the transfer of text messages, and the text messages were originally limited to a maximum of 160 characters. Various other features were designed into the original specifications to optionally provide notification to the originating user regarding the success or failure of delivery of the SMS messages, and regarding limitations on the length of time that the wireless network would hold a message for delivery.

SMS message coding for text has been enhanced, and now includes text coded in 7 bit GSM alphabet, 8-bit binary data, or Universal Character Set UCS2 16-bit coding which provides for non-Latin character sets. Because of the different lengths of characters in these formats, the maximum size of a message varies depending on the coding used. If coded in the GSM alphabet, the maximum message size is 160 characters, if coded in an 8-bit data format, the maximum size is 140 bytes, and if encoded using a Universal Character Set USC2 coding, the maximum size is 70 characters.

Two extensions to SMS provide for the exchange of rich-media messages that include text, pictures, melodies, and animation. These are basic and extended Enhanced Messaging Services (EMS). Basic EMS defines a format for inclusion of formatted text, black and white bitmap images, black and white bitmap animations, and monophonic melodies in messages. Basic EMS also allows included elements to be processed by the mobile phone as downloaded objects, so that ringtones and images can be saved by the phone separate from the EMS message itself. Basic EMS allows concatenation of messages to support the exchange of melodies and images greater than 140 bytes.

Extended EMS increases the flexibility of coding so that larger size messages can be transmitted, typically up to 8 fragments or a total of 1,000 bytes. Coding formats are expanded in extended EMS to include color text, grayscale and color pictures and animations, polyphonic MIDI melodies, and data compression. All SMS and EMS systems rely on the same underlying SMS transport architecture described below in more detail.

Further expansion of the scope of messaging includes the specifications for Multimedia Messaging Services (MMS) that have been defined by the Third Generation Partnership Project 2 (3GPP2) standards committees. One objective of these standards is to incorporate internet-compatible formats into mobile messaging, and facilitate the processing of very large sized messages by delivery of the message content using a high capacity packet data network. For the sake of simplicity, the present message processing methods and apparatus are largely described in the context of SMS messaging. However, it will be appreciated by those skilled in the wireless communications arts that the present methods and apparatus can be used to process MMS messages as well. In this case, all references to SMS messaging should be replaced with their MMS messaging counterparts.

Advertisement Content in SMS Messaging

Mobile communications devices, including cell phones, are increasingly being used to facilitate the purchase of goods and services, including music, "ringtones", games, and videos, among others. The vendors of such goods and services are interested in presenting advertisements to the cell phone users. Many users would likely consider it intrusive to receive advertising messages as separate messages, but would likely not consider it intrusive if the advertising messages were delivered as an attachment or extension to SMS messages.

Mobile devices are also being used to affect the purchase of goods and services that are delivered outside the domain of the communications system. For example, cell phones can be used to purchase tickets for use in public transportation systems. As another example, users can purchase movie tickets using their mobile devices. Historical information pertaining to such purchases provides information that is valuable to vendors when targeting advertisements to potential customers. In the purchase examples cited above, for example, the name of the ringtone or movie purchased by the user can be used by a vendor to determine the user's musical preferences and demographic group. Similarly, the location of a transit ticket can be used by a vendor to identify retail outlets in the vicinity of the user. Additionally, analysis of the content of SMS messages may assist in targeting advertisements to prospective customers.

The prior art systems and methods for combining advertisements with SMS messages have been limited and fail to take full advantage of the device and network capabilities, historical information related to user purchases, or information pertaining to particular device characteristics. For example, U.S. Pat. No. 6,381,465 to Chern, et al., issuing Apr. 30, 2002 (hereafter, "the '465 patent"), describes a monitoring and alert system including a wireless device that sends a monitoring request to a remote server. The '465 patent is incorporated by reference herein in its entirety for its teachings on SMS messaging and related methods and apparatus. In accordance with the incorporated '465 patent, when certain conditions are met, the server generates an SMS alert message. The server determines the maximum length in characters of the SMS message, and whether there is sufficient available space for an advertisement. If sufficient space remains, the advertisement is combined with the SMS message.

Disadvantageously, the '465 patent describes techniques whereby advertisement messages are combined with SMS messages based only upon the maximum character length of the SMS message. Information related to the destination user's historical purchases and other demographic information are not taken into account in the '465 advertisement inclusion determination. Nor does the '465 method consider information related to the destination mobile communications device when making this determination. Therefore, disadvantageously, the advertisement message is necessarily size limited in the '465 system. The '465 system is forced to use the most basic form of SMS messaging, i.e., single-fragment SMS messaging. Also, in the '465 system, disadvantageously, advertisement messages are appended to the SMS messages at the point of creation of the SMS messages, and not at the point of delivery, where information related to the destination user's device and purchasing interests is more readily available.

Therefore, methods and apparatus are needed that facilitate delivery of advertising messages and other content in combination with the transmission and reception of SMS messages. The advertising messages should be combined with SMS messages based upon, inter alia, information pertaining to characteristics of the destination mobile device in order to determine the best method for attaching the advertising messages. Other information should be considered in selecting the advertising message to be combined with the SMS message, including, but not limited to: information pertaining to the destination user's purchasing habits and demographic group; the content and format of the SMS message; the content and format of the advertising messages; cost metrics related to the cost of combining a selected advertising message with the SMS message and transmitting the combined message to the destination user; and limitations of the communications channel used to deliver the modified message to the mobile communications device.

The present teachings solve the aforementioned problems by providing highly reliable, cost-effective and efficient methods and systems for delivery of advertising content in short message service (SMS) messages.

SUMMARY

Methods and apparatus are described for processing short message service (SMS) and Multimedia Messaging Services (MMS) messages in a wireless communications system and selectively modifying the messages to include advertisements when appropriate. A signaling message processing and routing node transmits and receives SMS (or MMS) data packets via the wireless communications network. In one embodiment, the routing node includes an SMS (or MMS) message processing module that determines whether an original message should be modified to include advertising messages. The messages, whether modified or left unmodified, are forwarded to the destination mobile communications device. The SMS message processing module applies rules to match advertising messages with the SMS message, based upon a number of considerations including the content and format of the SMS message, the content and format of the advertising messages, the communications and display characteristics of the destination mobile communications device, the user's purchasing history and other behavior, and the limitations of the channels used to transmit the message to the destination device.

In one exemplary embodiment, the signaling message processing node comprises a Short Message Service Center (SMSC) or Multimedia Messaging Service Center (MMSC). The SMSC (or MMSC) includes the message processing module which analyzes the messages and determines whether or not to combine them with selected advertising messages for transmission to a destination mobile device. The message processing module also determines the message modification method and format used when transmitting the modified message.

The message processing module includes several databases that are used in processing messages and in selecting advertising messages for inclusion with the original messages. In one exemplary embodiment, the message processing module includes User Profile, Device Profile, User History and Advertising Message databases. These databases contain information pertaining to the device types, display capabilities, and communications protocols supported by the mobile devices. The databases also include information regarding alternative methods for the transmission and display of messages, and a list of keywords based upon historical usage of the mobile communications devices. Such a list of keywords may be created by statistical analysis of SMS messages, by analysis of purchases that the user has made using the mobile communications device, and by the location of the mobile communications devices. The advertising message database includes advertising message content formatted in one or more alternative formats, file size and format information related to the advertising messages, and keywords and advertising message values associated with the advertising messages. The file size and format information indicate the minimum requirements for the delivery and display of the advertising message to the destination mobile device.

An advertising message selection process determines which, if any, of the advertising messages stored in the advertising message database is combined with the SMS messages. The advertising message selection process uses the format and keyword information to create a list of potential advertising messages to be combined with the SMS messages. Advertisement cost and value metrics are defined and used in the advertising message selection process. In one embodiment, "ad cost", "ad value", and "net ad value" metrics are used in making the advertising message selection. The "ad cost" metric is defined as a function of the SMS message and the target delivery method. The "ad cost" metric determines the incremental cost of modifying an SMS message for delivery in an alternative format. It may, for example, reflect the cost of delivering the message in multiple fragments. In some embodiments, the "ad cost" metric is computed as a communications cost associated with the modified (modified to include the advertising message) SMS message format, less the communications cost associated with the unmodified SMS message format. For example, if the unmodified SMS message was originally transmitted in a single SMS fragment, and the modified SMS message that would result from attachment of the advertising message would require two SMS fragments, the "ad cost" comprises the cost of transmitting the additional SMS fragment.

The "ad value" metric is defined in some embodiments as the value that the wireless carrier receives for delivering the advertising message. The ad values may be created and maintained by either the wireless carrier or by the advertiser. In some embodiments, the ad values are determined by the wireless carrier to reflect the revenue that the carrier receives from delivering the advertising message. In cases where the ad values are maintained by the carrier, the ad values may be manually entered by a network operator, or automatically provided by a processing function such as an external system or another processing module that is integral with the message processing module. The ad values may be updated according to the wireless carrier's policies. In other alternative embodiments, the ad values are assigned by the advertiser to reflect the amount of money the advertiser will pay for the delivery of the advertising message.

In still other alternative embodiments, for example in cases where the advertising value and related costs are relatively constant or insignificant, a degree of match between the advertising message and the SMS message may provide a good metric for selection of advertising messages. In these embodiments, keyword values are assigned to each of the advertising message keywords associated with the advertising message record. The degree of match between a selected advertising message and the SMS message is determined by identifying all advertising message keywords that match keywords in the SMS message, and then summing the values of the matched advertising keywords. In this manner, the value associated with any one advertising message is a function of the number of matching keywords and the values associated with those keywords. In some embodiments, the keyword values may be created using a background process that assigns values based upon a variety of factors, including, for example, the relative likelihood of their occurrence. In other alternative embodiments, the keyword values may be determined by auction or other pricing mechanisms. In these embodiments, advertisers bid on keywords and the highest bidder is allowed to associate the auctioned keyword with their advertisement. The highest keyword value for a matching keyword is then used as the ad value metric for the selected advertisement.

In one embodiment, the SMS message processing module processes each SMS message and generates a complete keyword list associated with the message. The complete keyword list is used in selecting potential advertising messages from the advertising message database. In some embodiments, the complete keyword list is derived using all available information that is associated with the SMS message. In some embodiments, this information is obtained from the original SMS message itself, the User Profile, Device Profile, and User History databases. The SMS message processing module then retrieves all of the advertising messages having at least one keyword that matches a keyword in the complete keyword list. If no keyword matches are found (i.e., no advertising messages are retrieved), the original unaltered SMS message is forwarded to the destination mobile device. If at least one advertising message is retrieved, a "net ad value"

metric is computed for each retrieved advertising message. The "net ad value" metric is computed by subtracting the "ad cost" from the "ad value" for each retrieved advertising message. In some embodiments, if at least one retrieved advertising message has a positive "net ad value", the retrieved advertising message having the highest "net ad value'" is selected, and the original SMS message is modified to include the selected advertising message. If no retrieved advertising message has a positive "net ad value", the original unmodified SMS message is forwarded to the destination user. Methods used by the SMS message processing module for modifying the SMS message may include: expansion to multiple SMS messages or reformatting of the text to increase the message size; translation to alternative formats to increase the message size; and compression of the received SMS message to provide space for the included advertising messages. These modification methods may be used singly or in combination.

A method of processing messages in a wireless communications system for possible message modification to include selected advertisements is also disclosed. The method processes a message addressed to a destination mobile communications device, and using information pertaining to the device characteristics and capabilities of the destination device, the purchase history and user profiles associated with the destination device user, and other information, the method determines whether to augment the original message with advertising content. In one embodiment, the method generates a keyword list based upon the original message content, destination user and device profile information, and destination user history information. If the method determines that the original message should be modified to include advertising content, the method retrieves a subset of potential advertising messages from all available advertisements based upon keyword matches found in the advertising messages. All advertising messages having at least one keyword matching a keyword in the keyword list are retrieved as potential advertising messages. The method then selects one of the potential advertising messages for inclusion with the original message. In one embodiment, the method makes this advertising message selection based upon ad values associated with the advertising messages. The ad values may be assigned by network operators, advertisers, or they may be assigned automatically by an ad value assignment mechanism. In one embodiment, the advertising message having the highest net ad value is selected, and the method modifies the original message to include the selected advertising message.

BRIEF DESCRIPTION OF THE DRAWINGS

Embodiments of the disclosed methods and apparatus will be more readily understood by reference to the following figures, in which like reference numbers and designations indicate like elements.

FIG. 4 is a simplified Device Profile Database containing exemplary device profile records for use with the present message processing methods and apparatus.

FIG. 5 is a simplified User History Database containing exemplary user history records for use with the present message processing methods and apparatus.

FIG. 6 is a simplified Advertising Message Database containing exemplary advertising message records for use with the present message processing methods and apparatus.

DETAILED DESCRIPTION

Overview

Methods and apparatus are disclosed for processing messages in a wireless communication system and selectively modifying the processed messages to include selected advertisements. As noted briefly above, while the present methods and apparatus are largely described herein in the context of SMS messaging, it will be appreciated by those skilled in the wireless communications arts that all of the teachings apply equally well to MMS messaging. Therefore, specific references to SMS messaging and related processes and hardware are meant to also include references to their MMS messaging counterparts. For example, although an SMSC is described below with reference to FIG. 1, an MMSC would be used in an MMS messaging system. Similarly, although an SMS message processing module is described below with reference to FIG. 2, an MMS message processing module would be used in the MMS environment. The MMS processing module would provide similar or identical functions as provided by the SMS processing module, with the exception that MMS messages, rather than SMS messages, are processed.

Methods and apparatus are disclosed for reviewing SMS (or MMS) messages, and combining selected advertising messages with the SMS (or MMS) messages based upon at least one of several factors, including, but not limited to: the content and format of the messages; the characteristics of the destination mobile device; the purchasing history and demographic group of the destination user; the content and format of the advertising messages; metrics related to the cost of combining selected advertising messages with the SMS (or MMS) messages and transmitting the combined messages to the destination user; and limitations of the channel used to transmit the combined messages to the destination mobile device.

Figure 1:
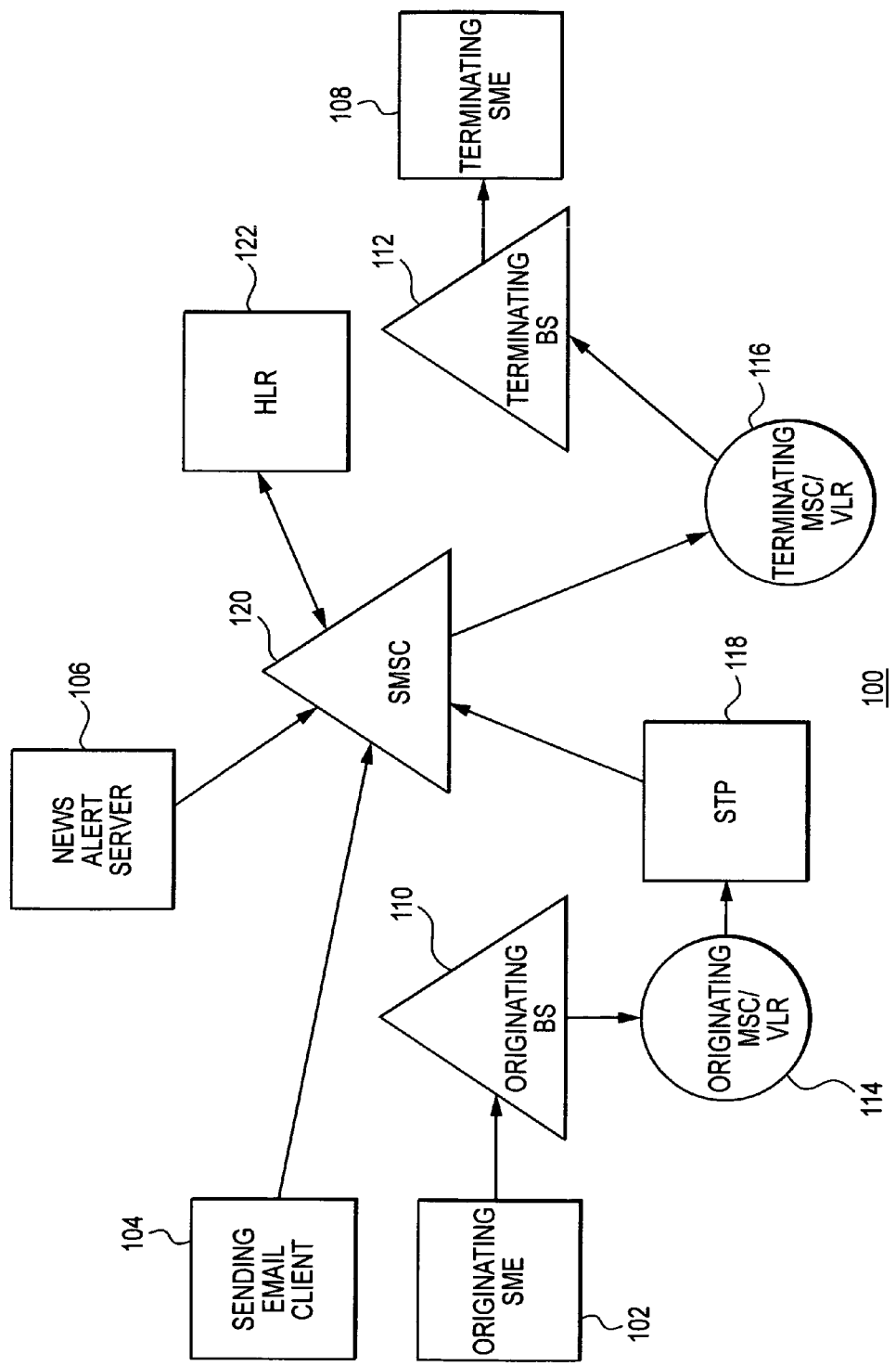
FIG. 1 is a network diagram illustrating network elements associated with the transmission and processing of SMS messages in a wireless communications network.

Exemplary Wireless Communication System for Use with the Present Method and Apparatus SMS messaging comprises an out-of-band message delivery service having low per-message bandwidth requirements. Consequently, SMS message services are appealing to network operators and owners. FIG. 1 is a network diagram illustrating an SMS implementation in a wireless communications network. FIG. 1 shows a typical configuration 100 of wireless network components used in the transmission of SMS messages from an originating Short Message Entity (SME) to a terminating SME. The wireless network components shown in FIG. 1 can be modified in accordance with the present teachings in order to deliver advertising content in the SMS messages. Other exemplary network configurations can be modified to practice the present methods and apparatus, such as, for example, the GSM SMS network implementation described in U.S. Pat. No. 6,819,932 issuing Nov. 16, 2004 to Allison, et al., which patent is hereby incorporated by reference herein as if set forth in full.

Referring now to FIG. 1, three possible SMS message origination points are shown: an originating Short Message Entity (SME) 102; a sending e-mail client 104; and news alert server 106. SMS messages are typically transmitted by the SME 102 to a destination (or "terminating") SME 108. Alternatively, SMS messages may be originated by the sending e-mail client 104 or the news alert server 106. The originating and terminating SMEs, 102 and 108, respectively, typically comprise wireless mobile devices, such as, for example, cell phones. The wireless network configuration 100 includes an originating base station 110 and a terminating base station 112. The originating SME 102 typically formulates and transmits an SMS message to the originating base station 110. In one embodiment, the originating base station 110 manages the network-to-air interface and reliably transmits the SMS message to the terminating base station 112 and terminating SME 108 via the core of the wireless communications network. As shown in FIG. 1, the core of the wireless communications network includes a pair of mobile switching centers (MSCs) 114 and 116, a signal transfer point (STP) 118, a short message service center (SMSC) 120, and a home location register (HLR) 122. In the embodiment shown in FIG. 1, the mobile switching centers 114, 116 comprise an originating MSC 114 and a terminating MSC 116. As described in more detail below, the mobile switching centers each include a visitor location register (VLR).

In some embodiments, the elements shown as individual components in FIG. 1 may be integrated and the functions performed by the components modified accordingly. Also, although some functions may be described herein as implemented in hardware, in some embodiments the functions may be implemented in software, and vice versa.

As noted above, in typical implementations, the originating SME 102 comprises a mobile phone. In typical operation, the originating mobile phone user enters the text address of the terminating SME 108 and an original text message. The originating SME 102 formats the original message into an SMS message which is transmitted to the originating base station 110. Alternatively, SMS messages may be originated by the sending e-mail client 104. In this case, a user typically enters the address of the terminating SME 108 and the original text message. The original text message is transmitted as an e-mail message to the SMSC 120.

The originating base station 110 manages the radio-frequency wireless communications network and thereby allows the originating SME 102 to transmit the SMS message to the SMSC 120 via the originating MSC/VLR 114 and the STP 118. The originating MSC/VLR 114 and terminating MSC/VLR 116 provide communications facilities for connecting the originating and terminating base stations, 110, 112, respectively, to the rest of the wireless network. The MSCs manage such functions as verifying the identity of the SMEs, monitoring the location of SMEs, generating billing records, and other higher level functions. The visitor location registers (VLR) are used to temporarily store information about subscribers who are currently "roaming" in the area serviced by the VLR. The VLR may belong to the mobile subscriber's home network or to a non-home network. Typically, the VLR databases are integrated within the MSCs 114, 116, as shown in FIG. 1. The VLRs store information needed to correctly route voice calls or data communications to the mobile subscribers. In some embodiments, the information may include international mobile station identification (IMSI), mobile identification number (MIN), mobile directory number (MDN), and mobile station international ISDN number (MSISDN), as well as the IDs of the VLR and MSC with which the subscriber is currently associated.

The originating signal transfer point (STP) 118 comprises a routing node that provides for the exchange of signaling data between the various components of the wireless network. As noted above, SMS messages are typically transported via signaling network elements, rather than through bearer channels. In North American and international wireless networks, SS7 signaling protocols and network elements are used to effect the routing of messages. These protocols are subject to standardization, and technical details vary depending on which standards body is responsible. SMS messages may also be transmitted through networks using Internet protocols.

As shown in FIG. 1, the STP 118 communicates with the SMSC 120. The SMSC 120 functions as a "store-and-forward" platform for the communication of short messages, wherein messages are relayed, stored and forwarded to the destination address. In contrast to earlier text message transmission services, such as alphanumeric paging, SMS messaging has been designed to provide "guaranteed" delivery of an SMS message to its destination. If a temporary network failure prohibits the immediate delivery of an SMS message, the short message is stored in the network (e.g., at the SMSC 120) until the terminating SME 108 becomes available. In some embodiments, the SMSC 120 may also provide the capability of receiving messages from external networks using e-mail or Internet protocols for incoming messages, which may be generated, for example, by the sending e-mail client 104 or the news alert server 106. In this scenario, the SMSC 120 may code the message using SMS formats and deliver the SMS message to the terminating SME 108.

The news alert server 106 provides a means for automatically generating SMS messages, which are transmitted to the SMSC 120 using e-mail or other Internet protocols for delivery to the terminating SME 108. An exemplary monitoring and alert system is described in the '465 patent incorporated by reference hereinabove.

The HLR 122 is a database platform that is in communication with the SMSC 120 and is used for the permanent storage and management of mobile service subscriptions, mobile subscriber profiles, and mobile subscriber location information. The HLR 122 permanently stores information about subscribers that belong to the same network as the HLR. The HLR 122 is used to permanently store and manage this subscriber information, provide service provisioning, and to store routing information that facilitates the delivery of calls, SMS messages, and other services to the terminating SME 108.

The terminating base station 112 manages the network-to-air interface between the terminating base station 112 and the terminating SME 108. The terminating SME 108 receives the SMS message and allows the terminating user to view or otherwise process the message.

Exemplary Message Flow Using the Wireless Communication System of FIG. 1

In order to facilitate understanding of the SMS implementation in the wireless communications network of FIG. 1, the actions taken and functions performed when transmitting an exemplary SMS message from the originating SME 102 to the terminating SME 108 are now described. In one exemplary SMS transmission, an originating mobile device user enters a message and the address of the terminating SME 108 via the originating SME 102. The originating SME 102 prepares an SMS message and transmits it to the originating MSC 114 via the originating base station 110. The originating MSC 114 verifies the identity of the originating SME 102 and the user's ability to transmit SMS messages, generates applicable billing records, and then routes the SMS message via the STP 118 to the SMSC 120 based on the address of the terminating SME 108 that is included with the SMS message.

In addition to performing other functions, the SMSC 120 queries the HLR 122 and determines if the terminating SME 108 is currently available to receive the SMS message, and if so, attempts to deliver the SMS message to the terminating SME 108 via the terminating MSC 116 and the terminating base station 112. The terminating SME 108 typically provides an alert to its user, and displays the text of the SMS message together with the address of the originating SME 102.

As noted above in the background, SMS messaging methods have been enhanced to facilitate the transmission of large size messages, and to allow the inclusion of non-text data including display formatting, graphic images, melodies, videos, and other content. These changes have been incorporated into the SMS wireless network implementations by layering the communication protocols. The original methods used to transmit text-only SMS messages have been used to provide the underlying transport services. For example, the SMEs 102, 108, and the SMSC 120, incorporate additional logic that discriminates between text-only SMS messages and SMS messages containing non-text data, or larger messages that have been broken into fragments. In this scenario, each fragment can be processed by the routing nodes, base station, and MSC elements as if it were an SMS message. However, fragments are concatenated by the terminating SME 108 before being displayed to the destination user.

The network architecture for Multimedia Messaging Service (MMS) messaging extends the SMS transport architecture with the addition of a mobile-initiated retrieval from a Multimedia Messaging Service Center (MMSC). The MMSC (not shown in FIG. 1) performs functionality similar to the SMSC 120, except that it process MMS messages. MMS messages are exchanged between mobile devices through a network of routing nodes, similarly as described above with respect to the SMS implementation shown in FIG. 1. As in the SMS implementation, MMS messages may be originated from outside the MMS network, for example by personal computers or from the Internet.

In the MMS implementation, MMS messages are typically transported through network facilities using Internet protocols, which allow greater flexibility and higher performance than do the signaling networks. The MMS message is routed from the originating SME 102, for example, through the wireless network, to the terminating MMSC (not shown in FIG. 1). It is stored by the terminating MMSC, and a notification message is transmitted to the terminating SME 108. The notification message is transmitted using the same transport network protocols as are used for SMS messaging. In some embodiments, the message content is retrieved using Wireless Application Protocol ("WAP"), Wireless Markup Language ("WML"), Extensible HyperText Markup Language ("XHTML"), or other Extensible Markup Language ("XML") browser formats, as used in mobile and non-mobile Internet applications. Upon receiving the notification message, the terminating SME 108 sends a request to the MMSC and receives the formatted MMS message, using a secure and reliable packet-switched wireless data network for this exchange.

In some embodiments, the notification can be delivered to the mobile device using a so-called "WAP push." As defined in the WAP standards, a WAP push comprises a specially encoded message that allows a URL link that addresses web content, together with notification text, to be transmitted to and displayed by a user. The user may optionally retrieve the content addressed by the URL link at a later time. WAP Push services are specified in a layered protocol, being delivered over the Wireless Datagram Protocol (WDP). WDP may, in turn, be delivered over either Internet Protocol (IP) or SMS bearer services. WAP Push is most commonly used on top of SMS bearer services, because of limited network and phone support for IP options such as General Packet Radio Service (GPRS).

Because SMS messages can be transmitted in a plurality of messaging formats, it is difficult to ensure that any one particular SMS message can be received and displayed by a selected destination mobile device. Consequently, text-only SMS messaging is the most common format that is used. As described in more detail below, the present methods and apparatus identify the characteristics and capabilities of the destination mobile device and appropriately prepare and transmit the SMS message for receipt and display by the destination device. In one embodiment, this information is used to display messages that are longer than the length limits that apply to the SMS text messages. As described in more detail below, this information is also used to exploit the full capabilities of the destination mobile device allowing for the display of non-text content when appropriate.

Use of Mobile Devices for Purchasing Goods and Services

As noted above in the background, in addition to performing other functions, mobile phones have provided a medium for the purchase of goods and services. Originally, these capabilities were developed to facilitate the purchase of ringtones and graphic images. These purchases can be made using an Internet browser executing on a microprocessor within the phone. Ringtones and graphic images may be transmitted to the terminating cell phone (e.g., the terminating SME 108) using one of the SMS messaging delivery mechanisms described above, or using the well known Internet browser mechanisms. Whether the information is delivered via SMS messaging or Internet browser technology, the terminating SME characteristics must be communicated to the wireless network. The type of SME being used by the user/purchaser is communicated so that the appropriate format is used to deliver the purchased content. The SME characteristics can be provided manually by the user (e.g., the user manually enters or selects the phone type being used), or automatically by the phone (e.g., the Internet browser retrieves this information from the phone upon initiation). Whether the SME type is obtained manually or automatically, the network components (i.e., the network components described above with reference to FIG. 1) that provide facilities for selection of content, delivery, and billing have access to information related to the SMEs and their characteristics.

Users' purchasing history also provides an indication of their personal interests. For example, downloading a ringtone from a particular genre of music helps in categorizing the user's demographic identity.

As noted above in the background, SMS messages are anticipated to become a medium for retail advertising. To prevent unwanted SMS messages or "spam" messages from offending mobile subscribers and overloading network bandwidth resources, network operators often limit the ability of their SMSC's (such as the SMSC 120) to accept messages from e-mail or Internet sources. Therefore, as described in more detail below, the present methods and apparatus advantageously allow advertising messages to be combined with other SMS message content, so that users are not unnecessarily alerted and yet advertisements can still be delivered. As described below with reference to FIGS. 2-8, in one embodiment, the best capabilities of the user's mobile device are utilized in order to present advertisements to the user. In addition, advertising messages are delivered in a manner that effectively manages the network bandwidth allocated for advertising purposes. Further, advertisements are selected to correspond to the user's known interests, thereby increasing the probability that the user will be interested in the content of the advertising messages.

SMS Message Processing System for Delivery of Advertising Content

Figure 2:
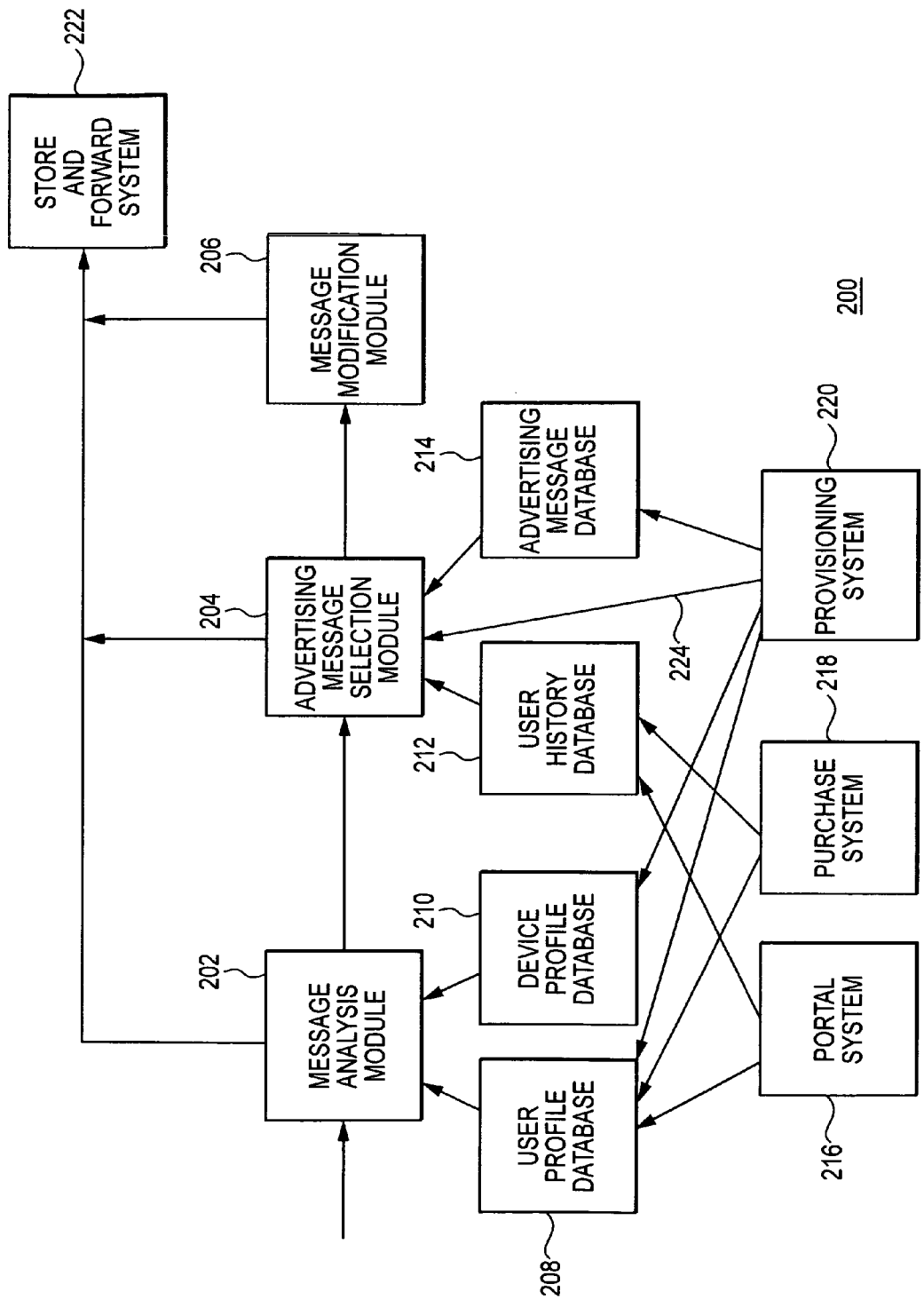
FIG. 2 is a block diagram of an SMS message processing module according to an exemplary embodiment of the present methods and apparatus.

One embodiment of the present method and apparatus for delivery of advertising content in SMS messages is implemented as part of a short message service center (SMSC) similar to the SMSC 120 described above with reference to FIG. 1. In this embodiment, an existing SMSC is modified to include extended SMSC components necessary to affect the delivery of advertising content in SMS messages. FIG. 2 shows a block diagram of an SMS message processing module 200 in accordance with the present teachings. In the exemplary embodiment shown in FIG. 2, the SMS message processing module 200 comprises a plurality of extended SMSC processing modules and databases.

Although the extended SMSC components are shown in FIG. 2 as individual processing blocks, it will be appreciated by those in the wireless communications arts that the components can be integrated into fewer processing blocks, or separated into even more processing blocks, as deemed necessary and appropriate by system designers. Also, although some SMS message processing functions may be described herein as implemented in hardware, in some embodiments the functions may be implemented in software, and vice versa. Further, alternative implementations of the SMS message processing module 200 may implement some of the extended SMSC processing modules using "plugins", filters or proxies, or some combination of these, in order to provide the SMS message functions described herein.

Referring now to FIG. 2, the exemplary embodiment of the SMS message processing module 200 includes three processing modules—a Message Analysis Module (MAM) 202, an Advertising Message Selection Module (AMSM) 204, and a Message Modification Module (MMM) 206. These processing modules have access to a set of four databases: a User Profile Database 208; a Device Profile Database 210; a User History Database 212; and an Advertising Message Database 214. In one embodiment, the databases 208, 210, 212 and 214 are populated and edited using the following external systems: a Portal System 216; a Purchase System 218; and a Provisioning System 220. As described below in more detail, these external systems provide mechanisms for creating, updating, editing and deleting the data records in the various databases. As shown in FIG. 2, the SMS message processing module 200 communicates with a typical SMSC Store and Forward System 222 which is implemented as a subsystem. Other exemplary embodiments may include a separate Store and Forward system, or a proxy or peer to a completely separate SMSC.

Message Analysis Module (MAM)

In one exemplary embodiment, the Message Analysis Module (MAM) 202 performs the following functions: (a) determines if the incoming message is destined for a valid user; (b) determines if the destination (or "terminating") user's profile exists and, if so, whether the destination user permits the reception of advertisements; (c) determines if the destination mobile device type is known; and (d) determines if the destination mobile device supports advertisements. In the exemplary embodiment, if any of these conditions fail, the MAM 202 immediately transmits the original unaltered message to the Store and Forward System 222 for delivery to the destination user. In accordance with the present teachings, the MAM 202 accesses both the User Profile Database 208 and the Device Profile Database 210 in order to make the determinations described above. The User Profile Database 208 and Device Profile Database 210 are described below in more detail. In one embodiment, the MAM 202 uses the destination address contained in the original message to retrieve a User Profile record that is associated with and corresponds to the destination mobile device. In some embodiments, the destination address comprises the destination user's telephone number. More generally, the address comprises the mobile station identification number (MSID) of the destination mobile device. Once the User Profile record is retrieved, the MAM 202 retrieves a Device Profile record that is associated with and corresponds to the destination mobile device type from the Device Profile Database 210.

The MAM 202 uses the information contained in the user and device profile records to determine if the destination user is valid, whether the destination user permits the reception of advertising messages, the destination device type, and whether the destination device supports advertisements if all of these conditions are met (i.e., the destination user is valid, permits advertising messages, and has a known type that supports advertisements), the message and associated device and user profile records are forwarded to the Advertising Message Selection Module (AMSM) 204 for further processing as described below. Otherwise, the message is immediately forwarded to the Store and Forward System 222.

In alternative embodiments, external processing systems or components can be used to access some or the entire user and device profile data, perform further calculations and determinations based upon the accessed data, or make use of metrics, such as, for example, system performance in making the determinations. Similarly, the present method and apparatus encompasses embodiments wherein "plug-in" devices are used to accomplish the described functions. The User Profile Database 208 and Device Profile Database 210 are now described in more detail.

User Profile Database

As described above, the User Profile Database 208 contains user profile records that are used by the Message Analysis Module 202 in determining whether to forward the message and associated data records to the AMSM 204 for further processing, or to forward the original unaltered message directly to the Store and Forward System 222. The User Profile Database 208 comprises user profile data records containing information about the destination user's device that is used by the MAM 202 in the processing of SMS messages. As described above, the User Profile Database 208 is indexed according to the destination address. Exemplary simplified user profile records 302 and 304 are shown in the exemplary User Profile Database 300 of FIG. 3. The user profile records are used by the SMS message processing module 200 in determining the protocol and display capabilities supported by the destination mobile device. As shown in the exemplary User Profile Database 300 of FIG. 3, in one embodiment, the user profile records contain information including the mobile device type 306, manufacturer of the device, model number, and messaging protocols 308 supported by the mobile device.

In some embodiments, this information is obtained during exchanges between the mobile device user and the Portal System 216 and/or the Purchase System 218. In one exemplary embodiment, entries in the User Profile Database 208 are created by the Provisioning System 220 when the mobile device user establishes a service contract with the wireless operator. In this embodiment, information related to the user's device type and limitations on the delivery protocols applied by the wireless operator (based on, for example, the user's contract and/or preferences) may be entered into the user profile database 208. This information can be used to restrict the delivery protocols that would otherwise cause the mobile user to be billed for wireless internet usage needed to access certain advertisements. Advertisements for a specific user may thus be blocked by indicating that no protocols are permitted. In some embodiments, the User Profile Database 208 may be updated according to the device type if this is modified when the mobile user accesses the Portal System 216 or the Purchase System 218.

Device Profile Database

As described above, the Device Profile Database 210 contains device profile records that are used by the Message Analysis Module 202 in determining whether to forward the message and associated data records to the AMSM 204 for further processing, or to forward the original unaltered message directly to the Store and Forward System 222. Information related to the display and communications capabilities of the destination mobile device can be used by the SMS message processing module 200 to determine: (a) possible methods of modifying the SMS message, and (b) costs associated with modifying an SMS message according to the type and size of advertising messages. Exemplary simplified device profile records are shown in the exemplary Device Profile Database 400 of FIG. 4. In some exemplary embodiments, the Device Profile Database 210 is indexed according to the destination Device Type information that is obtained from the User Profile Database 208. The Device Profile Database 210 provides a mechanism for determining the protocols, file formats, and maximum message sizes supported by the destination device. It also provides a mechanism for determining the screen size information related to the destination device. In one exemplary embodiment, entries into the Device Profile Database 210 are made by the wireless operator via the Provisioning System 220. In other exemplary embodiments, the mobile device indicates its capabilities to the Portal System 216 and/or the Purchasing System 218. In this embodiment, the data record entries are dynamically created to reflect the capabilities of the mobile device.

Advertising Message Selection Module (AMSM)

Referring again to the exemplary SMS message processing module 200 of FIG. 2, the Advertising Message Selection Module (AMSM) 204 receives the original message in addition to the associated user and device profile records (those records accessed from the User Profile Database 208 and Device Profile Database 210, respectively) from the MAM 202. As shown in FIG. 2, the AMSM 204 accesses data records stored in both the User History Database 212 and the Advertising Message Database 214. The User History 212 and Advertising Message 214 databases are described below in more detail. The AMSM 204 analyzes the information received from the MAM 202, and the data records accessed from the User History and Advertising Message databases, 212 and 214, and selects an appropriate advertising message from the Advertising Message Database 214 for combination with the original SMS message. In one exemplary embodiment, the information that is used by the AMSM 204 in selecting an appropriate advertising message from the Advertising Message Database 214 may include a list of keywords based, at least in part, on historical usage of the destination device. Such a list of keywords may be created in a variety of ways, including, but not limited to, statistical analysis of SMS messages, analysis of purchases made by the user via the destination device, and location of the destination device.

In one embodiment, the AMSM 204 retrieves a User History record that is associated with and corresponds to the destination address of the original SMS message. In some embodiments, the advertising message selection process then assembles keywords based upon all available information, including, for example, the original SMS message, the User Profile record, the Device Profile record, and the User History record. The AMSM 204 then retrieves the Advertising Message Database records that correspond to the assembled keywords. As described in more detail below, the Advertising Message Database records include an "ad value" field indicative of a value of delivering the selected advertising message to the destination mobile device. The AMSM 204 processes the "ad value" metrics, and based upon these metrics and other information available to the AMSM 204, selects an advertising message to be combined with the original SMS message. In some cases, as described below in more detail, no advertising message is selected and the original SMS message is transmitted, unmodified, to the Store and Forward System 222. Advertising message cost and value metrics are defined for use in the advertising message selection process. These metrics are described in more detail below. First, however, the User History and Advertising Message Databases, 212 and 214, respectively, are described in more detail.

User History Database and the Use of Keywords

As described above, the User History Database 212 contains user history records that are used by the AMSM 204 in determining which advertising messages to select from the Advertising Message Database 214. The User History Database 212 comprises user history data records related to a user's personal preferences based upon, among other factors, previous purchasing habits and network accesses. As described above, in one exemplary embodiment, the User History Database 212 is indexed according to the destination address. Exemplary simplified user history records are shown in the exemplary simplified User History Database 500 of FIG. 5. As shown in the exemplary simplified User History Database 500 of FIG. 5, in one embodiment, the user history records contain information including the record type 508 (e.g., "search", "purchase", and "navigate"), and keyword information 510.

User accesses to the Portal System 216 and the Purchasing System 218 provide useful information pertaining to the user's personal preferences and demographic identity. Advantageously, the present SMS message processing module 200 uses this information in selecting advertising messages from the Advertising Message Database 214. In one embodiment, records are created and stored in the User History Database (212, 500) whenever a user accesses the Portal System 216 or the Purchasing System 218. In one embodiment, keywords are associated with the web pages accessed by a user, and corresponding entries in the User History Database (212, 500) are created when the user performs selected actions, such as, for example, searching, navigating, and purchasing. The association of keywords to web pages may be performed automatically by the Portal 216 and Purchasing Systems 218. In one exemplary embodiment, the association of keywords to web pages relies upon recognition of keywords contained in the text of the accessed web pages. The list of possible keywords that can be recognized is derived by merging the keyword lists contained in the Advertising Message Database 214 (described below in more detail). In one embodiment, keywords contained in the web pages are dynamically recognized by the Portal 216 and Purchasing Systems 218. In this embodiment, each time a web page is accessed by a user, an entry is made in the User History Database (212, 500) if one or more of the possible keywords is contained in the accessed web page.

In some embodiments, the list of keywords derived from the User History Database (212, 510) may be supplemented during message processing. In this embodiment, the list of keywords derived from the User History Database (212, 500) is supplemented by analyzing the SMS message for the occurrence of keywords, and performing a text-matching process similar to that used in recognizing keywords in accessed web pages.

In other implementations, external systems and processes may be used to access user history records or to determine and generate the keyword information. In addition, in some embodiments, external systems can be used to retrieve the Advertising Message records from the Advertising Message Database 214. In some embodiments, keywords may be associated with web pages using "offline" processes. Off-line processing reduces demands associated with real-time processing of the databases, and the real-time extraction of keywords from the accessed web pages. In other embodiments, the Uniform Resource Locators (URLs) of the web pages accessed by the user are used as keywords. Using URLs as keywords allow advertisements to be targeted at specific web pages via manual entries into the Advertising Message Database 214. While this embodiment allows greater control over the pairing of advertisements and web pages, it requires greater manual effort than do the other implementations. In other embodiments, keywords may be weighted, and/or recommendations may be made to additional keywords. In other embodiments, the advertising message selection process may make use of the complete message history. Other implementations may include extensions to the various data records and configuration information to limit keywords via preferences or ratings. In this way, access to specified content may be selectively restricted (e.g., adult content may be restricted from youths).

Although keywords are described herein as comprising simple words (i.e., strings of characters without punctuation or blank spaces), it will be appreciated by those skilled in the computing and data processing arts that keywords may comprise any practical combination of text characters. For example, in some embodiments, keywords may comprise phrases, sentences, or external references (such as, for example, hyperlinks), depending on the source context.

Advertising Message Database

As described above, the Advertising Message Database 214 contains advertising message records that are used by the AMSM 204 in the Advertising Message Selection process. Exemplary simplified advertising message records are shown in the exemplary simplified Advertising Message Database 600 of FIG. 6 for a text message 602, a jpeg message 604, and a hyperlink 606. In one embodiment, the Advertising Message Database 214 is manually created and modified by an operator via the Provisioning System 220. Each entry in the Advertising Message Database 214 comprises an advertising message record defining the characteristics of its associated advertising message. As shown in the exemplary Advertising Message Database 600 of FIG. 6, in one embodiment, the advertising message records contain the following fields: File Format 608, Display Size 610, File Size 612, Advertising message 614, Keywords 616, and "Ad Value" 618. The File Format 608, Display Size 610, and File Size 612 fields of the advertising message record detail the minimum requirements for delivery and display of the selected advertising message to a mobile device. The Advertising message field 614 provides the content of the selected advertising message. In one exemplary embodiment, the Advertising message field 614 is coded using a subset of HyperText Markup Language (HTML) or Extensible Markup Language (XML), so that text formatting and embedding of links can be easily described. The HTML and XML coding allow processing of the text by the SMSC, for example, in order to convert the advertising message to simple text for inclusion in an SMS message. Alternatively, HTML or XML encoded text may be forwarded to the mobile device for further processing, for example, as part of an MMS message.

The Keyword and Ad Value fields, 616 and 618, respectively, characterize the advertiser's specifications pertaining to the advertising messages. In one embodiment, the advertising messages are selected according to keyword matching. In these embodiments, each advertising message record includes a list of keywords that must be recognized in the user's history or in the SMS message itself in order to select the record as one of the potential advertising messages to be combined with the original SMS message. As briefly noted above and as described in more detail below, the Ad Value comprises the revenue that the wireless network carrier receives for delivery of the associated and corresponding advertising message with the keywords as listed in the database. In other terms, the Ad Value indicates the amount of money an advertiser is willing to pay for the delivery of the selected advertising message. An advertising message may appear more than once in the Advertising Message Database 214 (i.e., several advertising message records in the database may contain identical advertising message content in their associated Advertising message fields). The Ad Values associated with multiple occurrences of an advertising message may differ based upon the different ad keywords associated with each occurrence. Stated in another way, because any one selected advertising message may have different keywords associated with it, and because the Ad Values may differ according to the associated keywords, the advertising message may have several entries in the Advertising Message Database 214.

As noted above, in some exemplary embodiments, the "ad value" metrics are used by the AMSM 204, together with other metrics (described below in more detail) and information, in performing the advertising message selection process. An exemplary Advertising Message Selection Process is now described, together with a description of the advertising message cost and value metrics used in the present message selection process.

Exemplary Advertising Message Selection Process

Use of Ad Cost and Ad Value Metrics

In one exemplary embodiment, the AMSM 204 selects an advertising message from the Advertising Message Database 214 based upon, among other factors, advertisement cost and value metrics associated with delivery of the advertising messages. In some exemplary embodiments, the advertising value metrics are determined based upon a number of factors, including, but not limited to, the following: costs associated with providing the advertising message as an extension of the original SMS message; costs associated with data transmission of the advertising message; user profile data (i.e., preferences); capabilities of the destination mobile device; a count of previous advertising message deliveries; previous advertising message effectiveness for selected keywords; previous usage of the advertising message with the sender or destination mobile user; previous advertising message effectiveness for the sender or destination user; and advertising campaign timelines and/or advertising campaign price models. In one exemplary embodiment, "ad cost", "ad value", "net ad value" metrics are defined in accordance with the present teachings and used in the advertising message selection process. These advertisement cost and value metrics are now described in more detail.

Ad Cost

In accordance with the present methods and apparatus, an "ad cost" metric is defined as a function of the SMS message and the target (or destination) delivery method. An "ad cost" metric is calculated "on-the-fly" by the AMSM 204 for each processed SMS message. The "ad cost" metric comprises the incremental cost to the network operator of modifying an SMS message for delivery in an alternate format. At its simplest, the "ad cost" is computed as the communications cost associated with the modified SMS message (modified to include the selected advertising message), less the communications cost associated with the unmodified SMS message. It may, for example, reflect the cost of delivering the message in multiple SMS message fragments. For example, if the unmodified SMS message was transmitted in a single SMS fragment, and the modified SMS message that results from attachment of the advertising message requires two SMS fragments, the "ad cost" comprises the cost of transmission of the additional SMS fragment. Therefore, in its simplest form, the ad cost metric is determined by determining the number of SMS fragments that must be added to the original SMS message in order to include the advertising message.

Most times, but not always, SMS messages are received in a single SMS message fragment. If the modified SMS message (modified to include a selected advertising message) requires 'N' additional SMS fragments, and the cost to the network operator of transmitting a single SMS fragment is defined as the constant 'C', the ad cost metric is computed as the quantity of (N*C). If additional network resources for storage and/or transmission of the resulting SMS message are required, as occurs, for example, in the delivery of messages using Multimedia Messaging Services (MMS), the cost to the network operator of allocating these resources is added to the ad cost metric. In addition, in cases where the original SMS messages comprise multiple-fragment SMS messages, the ad cost metrics are computed to reflect only the additional network costs associated with inclusion of the advertising messages. In some embodiments, as shown in FIG. 2 for example, the network cost information that is used to compute the ad cost values is provided to the AMSM 204 by the Provisioning System 220. In the example set forth above, for example, the value of the constant 'C' is provided to the AMSM 204 by the Provisioning System 220 via an input line 224. In cases where additional network costs are incurred from delivering the advertisements, these additional costs are provided to the AMSM 204 by the Provisioning System 220 via the input line 224.

In one described embodiment, it is assumed that the most significant cost contribution associated with the inclusion of the selected advertising message is the additional message fragments necessary to deliver the advertising message to the destination device. Therefore, in this case, the simple multiple calculation set forth above (i.e., N*C) is recommended. As noted above, however, and as will be appreciated by those skilled in the wireless communications arts, in other alternative embodiments, the ad cost metric can be modified as needed to account for additional network operator costs associated with the delivery of the advertising messages.

Ad Value

As described above, the SMS message processing module 200 includes a database of advertising messages. In the described embodiment, the advertising message database contains advertising messages formatted in one or more alternate formats. Each advertising message record includes an associated and corresponding advertising value (or "ad value") metric. Depending upon existing business relationships between the wireless network carriers and the advertisers, and other similar considerations, the ad values assigned to the advertising messages may be created and maintained by the wireless carrier, the advertiser, or both. In some embodiments, the ad values are determined by the wireless carrier to reflect the revenue that the carrier receives from delivering the selected advertising message. In these embodiments, the ad values may be manually created and maintained by the network operator, or automatically by a processing function such as an external system or other processing module. In some embodiments, the message processing module 200 described above with reference to FIG. 2 includes a processing module responsible for creating and maintaining the ad values. The ad values may be updated in accordance with the wireless carrier's policies and other similar factors. In other alternative embodiments, the ad values are assigned by the advertiser to reflect the amount of money the advertiser will pay for the delivery of the advertising message. In the embodiment of the message processing module 200 shown in FIG. 2, the Provisioning System 220 is used to input and maintain the ad values.

In still other alternative embodiments, for example in cases where the advertising value and related costs are relatively constant or insignificant, a degree of match between the advertising message and the SMS message provides a good metric for selecting the advertising messages. In these embodiments, the advertising message records described above with reference to FIGS. 2 and 6 would be modified to include keyword values. Rather than having a single Ad Value for the advertising record, in these embodiments, each advertising message has keyword values for every keyword in the advertising record. The degree of match between a selected advertising message and the SMS message is determined by identifying all advertising message keywords that match keywords in the SMS message, and then summing the values of the matched advertising message keywords. In this manner, the value associated with any one advertising message is a function of the number of matching keywords and the values associated with those keywords.

In some embodiments, the keyword values may be created by a background process that assigns values based upon a variety of factors, including, for example, the relative likelihood of their occurrence. The background process may be performed by a processing module that is part of the message processing module 200, or, in other embodiments, it may be performed by an external module or processing system. In one embodiment, the advertising message keyword values are determined as a function of the number of occurrences of the keywords in publicly available advertising content. The keyword occurrences can be determined in one embodiment by simply logging the number of times a selected keyword appears in the advertising content. In this implementation, the degree of match determination described above reflects how unlikely the match occurred by chance.

In other alternative embodiments, the keyword values may be determined by auction or other pricing mechanisms. In the "auction" embodiment, advertisers bid on keywords and the highest bidder is allowed to associate the auctioned keyword with their advertisement. As before, in the "auction" embodiment, all advertising message keywords matching keywords in the SMS message are identified, and the matching keyword having the highest keyword value is used as the Ad Value metric for the selected advertisement.

Net Ad Value

In accordance with the present methods and apparatus, a "net ad value" is defined as a function of the "ad cost" and "ad value" metrics described above. In one preferred embodiment, the "net ad value" metric of a selected advertising message is computed by subtracting the "ad cost" from the "ad value" for the selected message. If the "net ad value" of a selected advertising message is positive, the selected advertising message has positive value both to the network operator and the advertiser. If the "net ad value" is not positive, there is no value associated with including the selected advertisement with the original SMS message.

The SMS message processing module 200 processes each SMS message and generates a complete keyword list that is associated with the SMS message. The complete keyword list is generated by the AMSM 204 using all available information that is associated with the SMS message. This information includes the original SMS message content and all other information associated with the SMS message contained in the User Profile 208, Device Profile 210, and User History 212 databases. The databases contain information pertaining to: user search, navigation and purchase history; user profile; and message and/or complete conversation text. In some embodiments, the User profile data may restrict or even prohibit generation of the complete keyword list. The AMSM 204 then accesses the Advertising Message Database 214, and retrieves all advertising message records having at least one keyword that matches a keyword in the complete keyword list. If no keyword matches occur, no messages are retrieved by the AMSM 204, and the original unaltered SMS message is forwarded to the Store and Forward System 222 for delivery to the destination device. The retrieved advertising message records therefore include all of the advertising messages that may potentially be selected for combination with the original SMS message.

The AMSM 204 then computes a "net ad value" metric for each retrieved advertising message record. The "net ad value" metric is computed by subtracting the "ad cost" from the "ad value" for each retrieved advertising message record. In some embodiments, if at least one retrieved advertising message has a positive "net ad value", the retrieved advertising message having the highest "net ad value"' is selected, and the original SMS message is modified to include the selected advertising message. In some alternative embodiments, the AMSM 204 may not necessarily select the retrieved advertising message having the highest net ad value. If no retrieved advertising message has a positive "net ad value", the original unaltered SMS message is forwarded to the Store and Forward System 222 for delivery to the destination device. In the positive case, the AMSM 204 forwards the original SMS message, all previously retrieved database records, and the selected Advertising Message record, to the Message Modification Module 206 for further processing. The Message Modification Module 206 is now described in more detail.

Message Modification Module (MMM)

The Message Modification Module (MMM) 206 receives the original message and the four related database records from the AMSM 204. The MMM 206 determines how to augment the original message with the selected advertising message, and how the modified message is best communicated to the destination mobile device. The MMM 206 determines the output format and communication protocol to be used in delivering the modified message to the destination device. Some embodiments may include support for multiple types of Store and Forward Systems (such as the Store and Forward System 222 of FIG. 2) including use of communications protocols such as EMS and MMS. Methods for modification of an SMS message may include expansion to multiple SMSs or reformatting of the text to increase its size, translation to an alternative format to increase its size, or compression of the received SMS message to provide space for advertising messages. These methods may be used singly or in combination.

The output format selected by the MMM 206 may require transcoding from the original single or multiple-fragment SMS message to the following: single-fragment SMS; multiple-fragment (binary) SMS, EMS. Alternative embodiments may support other existing communications protocols, such as, for example, the Simple Mail Transfer Protocol (SMTP), and other future delivery protocols. The MMM 206 performs all of the above described (paragraph 90 and 91) message processing and modification and coding functions As noted above, modification of the message may result in the use of alternative communication and display methods. For example, as noted above, the SMS message may be expanded to include multiple SMS fragments, or it could be recoded and transmitted as an EMS or MMS message, allowing the use of colors and graphics. In other embodiments, the SMS message is transmitted to the destination user by means of a WAP push. The so-called "WAP push" allows WAP message content to be "pushed", or delivered, to the destination mobile device with minimum user intervention. The WAP push comprises a specially encoded message which includes a link to a WAP address. In this example, use of an SMS bearer service is preferred because IP (GPRS) bearers, although theoretically possible, are not generally supported by mobile telephones. In some embodiments, the Push Proxy Gateway function is implemented as part of the SMS message processing module 200.

The modified message may contain various visual elements as well as links to more information or premium content. If the message is recoded as an MMS message or transmitted by means of a WAP push, the body of the message including the original SMS text (i.e., the message content) is retained at the SMSC (or MMSC) as part of the recoded message, and the SMS message that is delivered to the terminating SME comprises a link or reference to the recoded message.

In some alternative embodiments, the MMM 206 may calculate transmission costs associated with various formats, both for the advertising company and for the destination user, and manage those costs according to configuration data of the messaging server operating company.

Once message modification processing is complete, the augmented message is forwarded to the Store and Forward System 222 for delivery to the destination user.

External Systems

Portal, Purchase and Provisioning Systems

There are three external systems shown in FIG. 2 that provide required support for the SMS message processing module 200. These external systems provide mechanisms for creating, updating, deleting, and otherwise maintaining records in the various databases. For example, the Portal and Purchase Systems 216 and 218, respectively, each have access to the User Profile 208 and User History 212 databases. In addition to performing other useful functions, these external systems capture information about the user and the user's device, allow edit of the User Profile records, and capture information related to user navigation, search and purchase history. As shown in FIG. 2, the Provisioning System 220 has access to the User Profile 208, Device Profile 210 and Advertising Message 214 databases. The Provisioning System 220 is typically operated by system support personnel rather than end users, and provides the ability to modify configuration records for devices and advertisements. As described above, the Provisioning System 220 is also used: in some embodiments to provide communication cost information to the AMSM 204. For example, as described above, the Provisioning System 220 can be used in some embodiments to provide the cost associated with the transmission of a single SMS fragment (i.e., the constant 'C' defined above) to the AMSM 204. As shown in FIG. 2, the Provisioning System 220 can also input additional data transmission network cost information to the AMSM 204 via the data input line 224. In some alternative embodiments, further configuration data may be provided by the external systems than those described herein. In addition, although not specifically illustrated in the figures, the present methods and apparatus encompass systems having connectivity to additional external systems that are able to provide such records.

Message Processing Example

Figure 3:
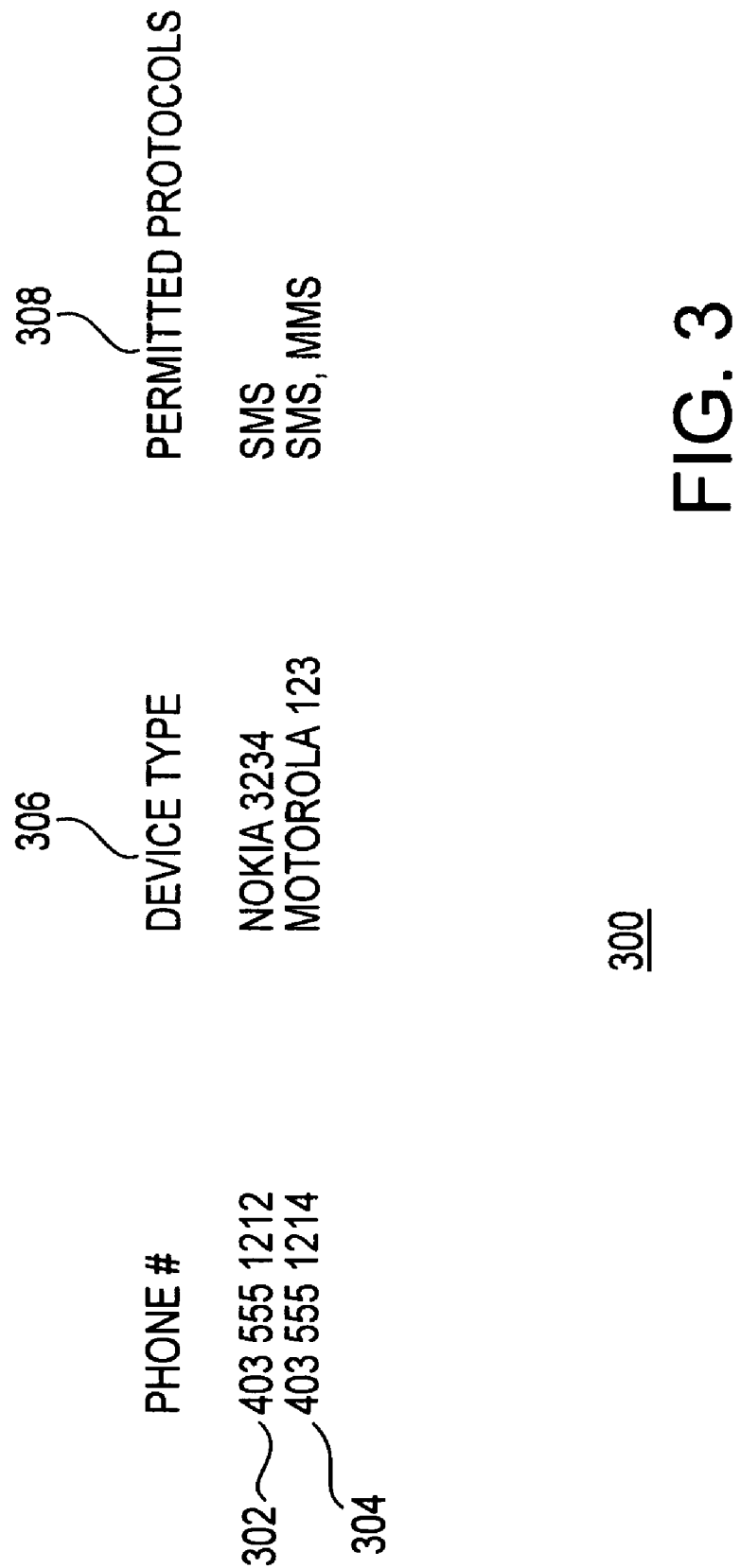
FIG. 3 is a simplified User Profile Database containing exemplary user profile records for use with the present message processing methods and apparatus.

As described above, the SMS message processing module 200 provides a means of augmenting SMS messages with advertisements. A simplified message processing example is now described to aid in the understanding of the present SMS message processing methods and apparatus. Reference is made to the exemplary simplified User Profile Database 300 (FIG. 3), the exemplary simplified Device Profile Database 400 (FIG. 4), the exemplary simplified User History Database 500 (FIG. 5), the exemplary Advertising Message Database 600 (FIG. 6), and the exemplary mobile communications device screenshots 800 shown in FIG. 8. As described above, message processing begins with the receipt of an original message, which might be displayed in this example as shown in the mobile device screenshot 802 (shown on the left side of FIG. 8). In this example, the destination address comprises the telephone number of the destination mobile device. In this example, the destination telephone number associated with the message shown in screenshot 802 is specified as "403-555-1212". The MAM 202 accesses the User Profile Database 208 (described above with reference to FIG. 2) using this destination telephone number as an index into the User Profile Database. As shown in FIG. 3, the exemplary User Profile Database 300 contains two exemplary simplified user profile records 302 and 304. User profile record 302 is associated with telephone number "403-555-1212", and user profile record 304 is associated with telephone number "403-555-1214".

The MAM 202 obtains the user profile record 302 which matches the destination address. The user profile records 302 and 304 include information related to the destination mobile device. For example, as shown in FIG. 3, the user profile records include a device type field 306 and a permitted protocols field 308. The device type field 306 describes the destination mobile device type. The permitted protocols field 308 describes the communications protocols permitted by the destination mobile device. As shown in FIG. 3, the user profile record 302 specifies that the destination user's device is identified as a "Nokia 3234". The destination user's profile indicates that only SMS messaging protocols may be used in transmitting messages to this destination mobile device (as indicated in the permitted protocols field 308). Therefore, the MMM 206 may only use SMS messaging in the message modification process in order to transmit the modified message to this destination device. As noted above, the user profile records (e.g., the records 302 and 304) may be managed by external applications in some embodiments, thereby allowing a user to configure her profile. In other embodiments, the user profile records may be configured by external systems, including provisioning systems, and/or other SMSC or MMSC systems.

As shown in the exemplary simplified Device Profile Database 400 of FIG. 4, the device identified as "Nokia 3234" has two associated and corresponding device profile records 402 and 404. The first device profile record 402 indicates support for SMS messaging, and the second device profile record 404 indicates support for EMS and MMS messaging. In one embodiment, as described above with reference to FIG. 2, the Device Profile Database (210, 400) is accessed by the MAM 202 in order to obtain information regarding the destination mobile device. This information includes the communications protocols, file formats, and maximum message sizes supported by the destination device. The destination device screen size is also provided. In some exemplary embodiments, as described above, the Device Profile Database 400 is indexed according to the destination Device Type information that is obtained from the User Profile Database 300. Referring now to FIG. 4, the device profile record 402 (corresponding to the device type "Nokia 3234") is accessed using the device type "Nokia 3234" as an index. Device profile record 402 indicates that the destination device uses a "text" format, supports the SMS protocol, has a screen size of 2×20 characters, and has a maximum message size of 1600 bytes. Note that this large maximum message size implies that the destination device supports fragmentation of the SMS message.

As described above with reference to FIG. 2, the MAM 202 forwards the original message and the associated user and device profile records to the AMSM 204 for further processing. The AMSM 204 uses this forwarded information and information obtained from both the User History 212 and the Advertising Message 214 databases to determine which, if any, of the advertising messages to include with the original message. As described above in more detail, the User History Database 212 may be accessed in one embodiment using the destination address (e.g., in this example, the destination telephone number) as an index. As shown in FIG. 5, the exemplary simplified User History Database 500 includes three user history records, 502, 504 and 506. Two of these user history records, 502 and 504, are associated and correspond to the destination address for the exemplary message (i.e., telephone number "403-555-1212"). The user history associated with this destination telephone number includes both a "search" and a "purchase" record type 508, each having associated keywords in their associated Keywords fields 510.

Both the keywords and the full text of the original message are used in the advertisement message selection process to retrieve a group of potential advertising messages from the Advertising Message Database 214. As shown in the exemplary simplified Advertising Message Database 600 of FIG. 6, two advertising message records have Keyword fields 616 containing the word "ringtone". This keyword matches the "ringtone" keyword gleaned from the original message text (shown in the screenshot 802 of FIG. 8). As shown in FIG. 6, the matching "text" record 602 has an associated encoded text advertising message of "Ringtones<br>www.abc.com". The matching "Hyperlink" record 606 has an associated advertising message with similar but more sophisticated text (i.e., "Ringtones<br> <a href="www.abc.com"> click here</a>". Because both of the advertising records 602 and 606 have keywords matching the message keyword "ringtones", both of the advertising records 602 and 606 are retrieved from the Advertising Message Database 600 as possible advertising messages.

The present message processing method then computes a "net ad value" metric for each retrieved advertising message record, and determines if at least one retrieved advertising message results in a positive net ad value. In the present simplified message processing example, it is assumed that both retrieved advertising message records result in positive net ad values. The present method and apparatus takes all of the above-described records and original message text into account, and determines that the user has permitted only SMS output format advertisements, that the destination device supports this protocol with fragmented messages, and that the destination user's history and present incoming message have keywords matching keywords associated with two possible advertisements. However the user's profile record 302 only permits the reception of SMS messages. Therefore, the "Hyperlink" advertisement (i.e., the advertising message contained in the advertising message record 606) is negated. This leaves only the "text" advertisement (i.e., the advertising message contained in the advertising message record 602) remaining. In other examples, multiple advertising messages might be selected having differing associated Net Ad Values. In this case, in some embodiments, the advertising message having the highest Net Ad Value is selected for inclusion with the original message. If multiple equivalently valued advertising messages remained, an extended advertising message selection algorithm could be used to balance usage. One exemplary technique could make use of a "round-robin" method.

Finally, the original message (shown in the screenshot 802) is augmented to include the selected "text" advertisement. The resulting modified message is illustrated in the screenshot 804 (shown on the right side of FIG. 8). An exemplary method for selecting and including advertisements in a transmitted message is now described with reference to FIG. 7.

Figure 7:
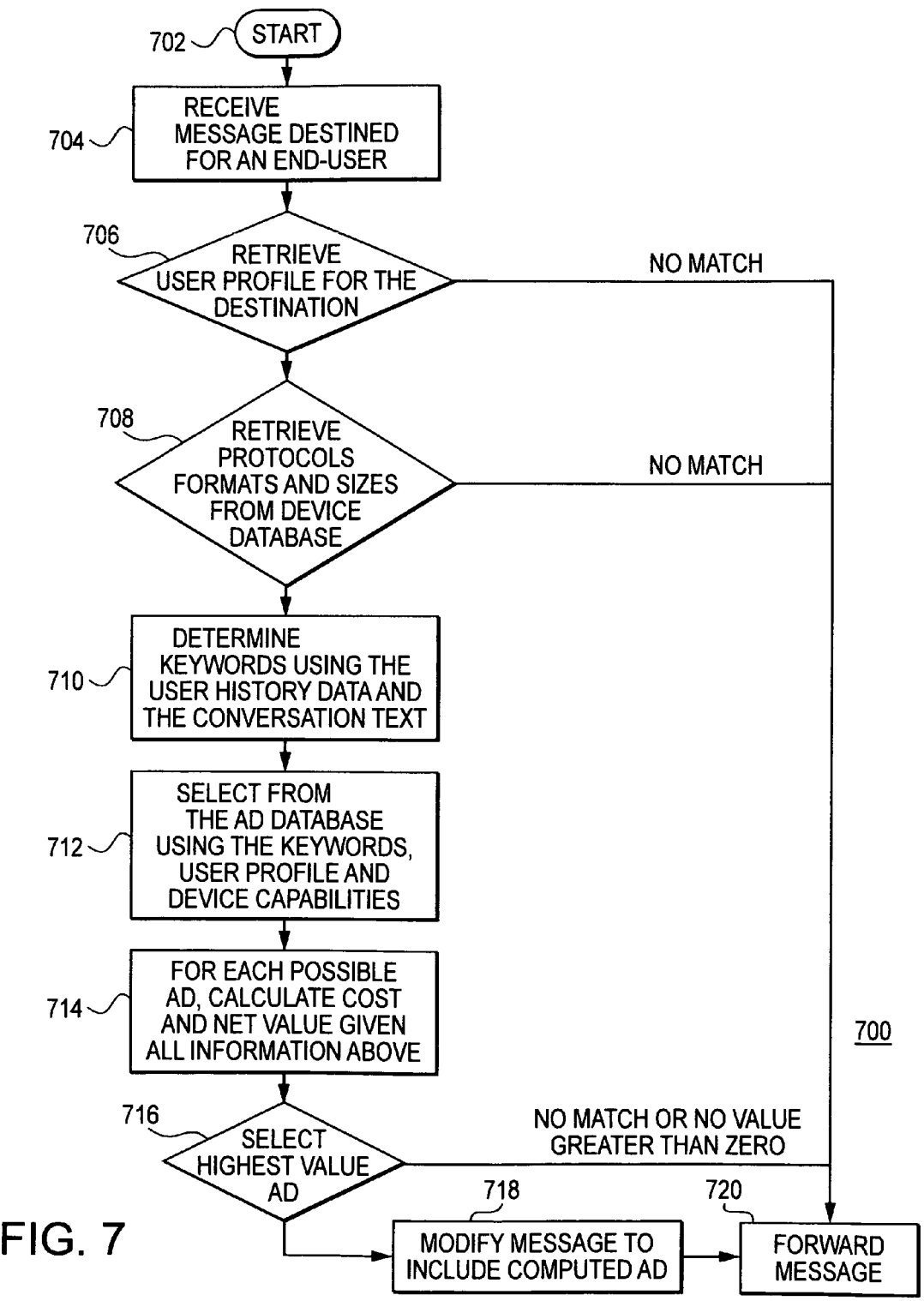
FIG. 7 is a flowchart of a method of processing messages in a wireless communications system for possible message modification to include selected advertisements.
Figure 8:
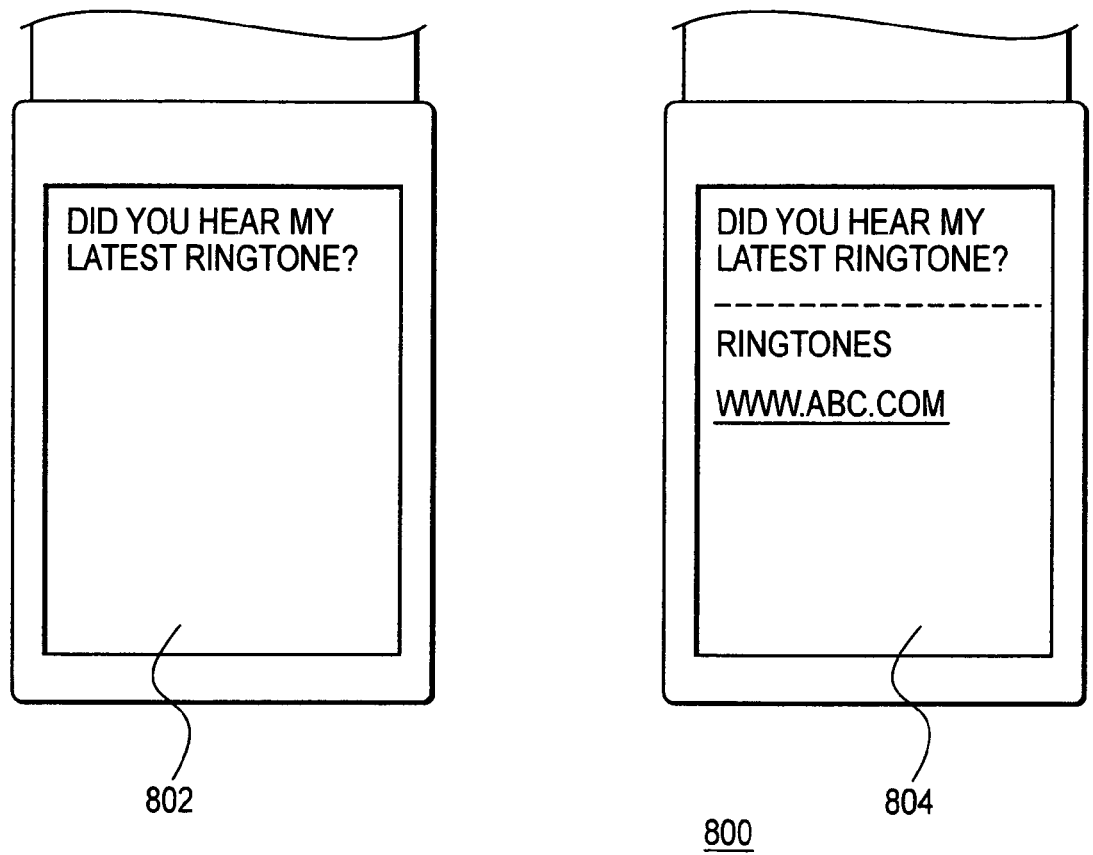
FIG. 8 illustrates exemplary mobile communication device screenshots showing an exemplary original message and a corresponding modified message, wherein the original message is modified to include a selected advertising message.

Exemplary Method of Selecting and Including Advertisements in Processed Messages FIG. 7 is a flowchart of a method 700 of processing messages in a wireless communications system for possible message modification to include selected advertisements. The method 700 comprises a generalized message processing method that analyzes a message addressed to a destination mobile device and determines whether or not to augment the message with advertisement content. The method 700 analyzes the message content, and based upon a number of factors, selects an appropriate advertisement for inclusion in the modified message. The method 700 then modifies the original message to include the selected advertisement. While the method 700 may be used in the embodiments described above (e.g., the message processing module 200 described above with reference to FIG. 2) to process SMS and MMS messages addressed to a destination mobile device, it will be understood by those skilled in the data processing arts that the method 700 is not limited to any one specific hardware implementation. Nor is the message processing method 700 limited to the processing of SMS and MMS messages.

Rather, as will be appreciated by the skilled person, the present method 700 processes a message addressed to a destination mobile communications device, and using information pertaining to the device characteristics and capabilities of the destination device, the purchase history and user profiles associated with the destination device user (i.e., the "destination user"), and other information, the method 700 determines whether to augment the original message with advertising content. In one embodiment, the method 700 generates a keyword list based upon the original message content, destination user and device profile information, and destination user history information. If the method 700 determines that the original message should be modified to include advertising content, the method 700 retrieves a subset of potential advertising messages from all available advertisements based upon matching keywords in the keyword list and in the advertising messages. The method 700 then selects one of the potential advertising messages for inclusion with the original message. In one embodiment, the method 700 makes this advertising message selection based upon values associated with the advertising messages. The values may be assigned by the network operators, advertisers, or they may be automatically assigned by an advertisement value assignment system. In one embodiment, the advertising message having the highest net value is selected, and the method 700 modifies the original message to include the selected advertising message. The selected advertisement may, in some embodiments, comprise a combination of textual, image, audio, and video information. The present message processing method 700 is now described in more detail with reference to FIG. 7.

As shown in FIG. 7, the method begins processing at a STEP 702. Any initial processing tasks required by a particular implementation may be performed during this step. The method receives an original message at the STEP 704 which is addressed to a destination mobile device. In some embodiments, the destination mobile device address comprises the destination mobile device telephone number. In one exemplary embodiment, only messages transmitted to a terminating SME (such as the terminating SME 108 of FIG. 1) need be considered for augmentation. As described above with reference to the message processing module 200 of FIG. 2, in some embodiments both SMS and MMS messages are processed. However, other messaging formats may be used with the present methods and apparatus. Also, as noted above with reference to the description of the message processing module 200 of FIG. 2, in cases where SMS messages are processed, the original message may comprise a multiple-fragment SMS message. In this embodiment, the complete original message is assembled based upon the multiple SMS fragments, and the complete original message is received at the STEP 704.

As will be appreciated by those skilled in the wireless communications arts, although the original message is described above as being processed at the SMSC (e.g., the SMSC 120 of FIG. 1) or MMSC in the case of MMS messaging, it can be intercepted for processing at any other convenient point of transmission between the originating SME 102 and the terminating SME 108. In some embodiments the best point for intercepting the original message is just prior to the point of delivery to the destination user. However, reasons for moving the processing point elsewhere in the wireless network may exist, in which case the processing point can be moved further back in the network. Such reasons may include commercial considerations associated with intercepting all messages transmitted between carriers, or with intercepting all messages received from the Internet. Further, for MMS message processing (i.e., when the method 700 receives an MMS message at the STEP 704), advertising message selection (described below with reference to STEPs 712 and 714) can be deferred until the destination device accesses the MMSC to retrieve the original message. In this case, the characteristics of the destination device can be provided to the method 700 when the MMS notification is pushed to the destination device.

Referring again to FIG. 7, the method 700 then proceeds to a STEP 706 whereat user profile information associated with the destination user is retrieved. The user profile information may contain information related to the destination user's preferences, mobile device type, manufacturer of the device, model number, and messaging protocols supported by the destination device. As described above with reference to FIGS. 2 and 3, the user profile records may be accessed using the destination mobile device address (e.g., the destination device telephone number in some described embodiments) as an index. If no destination user profile is found at the STEP 706, the method 700 proceeds to a STEP 720 whereat the original unaltered message is forwarded to the destination device. However, if a matching destination user profile exists, it is retrieved for further message processing. The method 700 then proceeds to a STEP 708 whereat the method 700 obtains information pertaining to the display capabilities, communications protocols, and other information specific to the destination device.

In one embodiment, the method 700 determines if the destination mobile device has a corresponding device profile, and if so, this information is retrieved at the STEP 708. If no destination device profile is found at the STEP 708 (i.e., no device profile exists for the destination device), the method 700 proceeds to the STEP 720 whereat the original unaltered message is forwarded to the destination device. In some embodiments, the device type information included in the user profile retrieved during the STEP 706 is used as an index for retrieving the device profile information. In some embodiments, the device profile information includes the communications protocols, display formats, and maximum message sizes supported by the destination device. The device profile may also include information related to the destination device screen size.

In one embodiment, as shown in FIG. 7, having found valid user profile and device information associated with the destination device, the method 700 generates a complete list of keywords at a STEP 710 using all sources of information related to the destination user and the destination device. In one embodiment, this information includes: search, navigation and purchase history information related to the destination user; destination user profile data; and message or complete conversation text. In some embodiments, the destination user profile information may limit or completely prohibit generation of the keyword list. As noted above in the description of the message processing module 200 of FIG. 2, in some embodiments the term "keyword" is used to describe simple words (i.e., strings of characters without punctuation or white space). Alternative embodiments may define "keywords" as any combination of characters which may, in fact, comprise a phrase, sentence, or external reference (such as Hyperlinks), depending on the source context.

Also, as described above, keywords may be generated in a variety of ways to suit network operator and advertiser needs. For example, in some embodiments the keywords are created via statistical analysis of messages, analysis of purchases made by the destination user, and location of the destination device. In other embodiments, external systems and processes may be used to access the user, device and user history profiles to determine and generate the keyword information. In some embodiments, keywords may be associated with web pages accessed by the destination user. In other embodiments, the Uniform Resource Locators (URLs) of the web pages accessed by the user are used as keywords. In other embodiments, keywords may be weighted, and/or recommendations may be made to additional keywords.

Once a list of keywords is generated at the STEP 710, the method 700 proceeds to a STEP 712 whereat a subset of potential advertising messages is retrieved from all available advertisements. In one embodiment, the subset of potential advertising messages is determined based upon keyword matches found in the advertising messages. In this exemplary embodiment, all advertising messages having at least one keyword matching a keyword in the keyword list are retrieved. The method 700 then proceeds to a STEP 714 whereat an advertising message selection process is initiated.

In one embodiment, at the STEP 714, the method 700 determines or otherwise associates an advertisement value (i.e., an "ad value") with each retrieved advertising message. The advertisement values can be determined or assigned in a variety of ways. In one embodiment, the advertisement values are assigned to each advertising message by the network operator. In other embodiments, the advertisement value is assigned to each advertising message by the advertisers. In some embodiments, the advertisement value may be computed using the following information: the costs associated with message extension as a result of including the selected advertisement with the original message; the costs of transmitting the modified message; user profile data (i.e., user preferences); device capabilities; previous advertising message delivery count; effectiveness of previous adverting message for selected keywords; effectiveness of the advertising message for the originating or destination user; usage of the advertisement by the originating or destination user; campaign timelines and/or pricing models associated with the selected advertisement; and other factors. Some of these mechanisms may require data record fields that expand upon the database records described above with reference to FIGS. 2-6. In the illustrated embodiment, the method 700 computes or otherwise determines a net advertisement value for each retrieved potential advertising message at the STEP 714. As described above, the net advertisement value may be computed in some embodiments by subtracting the cost of delivering the potential advertisement to the destination user from the value assigned to the potential advertisement.

The method 700 then proceeds to a STEP 716 whereat the potential advertising message retrieved during the STEP 712 having the highest advertisement value determined at the STEP 714 is selected for inclusion with the original message. If no advertising message has an associated positive net advertisement value (i.e., the assigned advertisement value does not exceed the cost of delivering the advertisement to the destination user), the method 700 proceeds to the STEP 720 whereat the original unaltered message is forwarded to the destination device.

Having selected an effective (i.e., a retrieved potential advertisement having the highest associated net advertisement value) advertisement solution, the method 700 proceeds to a STEP 718 and determines an appropriate message modification mechanism for use in including the selected advertisement with the original message. As described above in more detail, any specific implementation may not necessarily modify the original message with the advertising message having the highest net advertisement value. For example, in one embodiment the file format associated with the retrieved advertisement is taken into consideration during the advertisement selection process. In this embodiment, the format used to deliver the modified message to the destination user is determined by selecting the advertisement that has both the highest net advertisement value and a file format permitted by the destination User Profile.

Alternative implementations may chose to determine the transmission cost for various formats, both for the advertiser and for the mobile device user, and to manage those costs according to configuration data of the messaging server operating company. In some embodiments, the selected output format may require transcoding from the original single or multiple-fragment SMS to the following: single-fragment SMS; multiple-fragment (i.e., binary) SMS; EMS; and MMS. Alternative embodiments may support other existing protocols such as SMTP, or perhaps other future data delivery specifications. The method 700 then proceeds to the STEP 720 and forwards the modified message to the destination device.

CONCLUSION

The foregoing description illustrates exemplary implementations, and novel features, of aspects of methods and apparatus for effectively processing messages in a wireless communications system. In accordance with the present disclosure, original messages transmitted from an originating SME and addressed to a terminating SME are intercepted and processed. The messages are processed to determine whether the original message should be modified to include advertisement content. Rules are applied to match advertising messages with the original message content, based upon a number of considerations including the content and format of the original message, the content and format of the advertising messages, the communications and display characteristics of the addressed destination mobile communications device, the destination user's purchasing history and other behavior, and the limitations of the channels used to transmit the message to the destination device.

Given the wide scope of potential applications, and the flexibility inherent in digital design, it is impractical to list all alternative implementations of the present methods and apparatus. Therefore, the scope of the presented disclosure should be determined only by reference to the appended claims, and is not limited by features illustrated or described herein except insofar as such limitation is recited in an appended claim.

While the above description has pointed out novel features of the present teachings as applied to various embodiments, the skilled person will understand that various omissions, substitutions, permutations, and changes in the form and details of the illustrated message processing methods and apparatus may be made without departing from the scope of the disclosure. For example, the messages processed by the present message processing methods and apparatus may comprise both single-fragment and multiple-fragment SMS messages. In the embodiments wherein multiple-fragment SMS messages are processed, the SMSC assembles the multiple SMS message fragments into a complete message for subsequent message processing. The present advertising-related message processing methods and apparatus are applied to the completed message. The buffering methods, mechanisms and techniques for assembling the completed message are well known, and therefore are not described in detail herein.

Similarly, the messages processed by the present message processing methods and apparatus may comprise MMS messages. In the MMS embodiments, the methods and apparatus for delivery of advertising content in the MMS messages are implemented as part of a Multimedia Messaging Service Center (MMSC). In this embodiment, an existing MMSC is modified to include extended MMSC components. The extended MMSC components are similar or identical in function to the SMS message processing module 200 described above with reference to FIG. 2, with the exception that MMS messages (rather than SMS messages) are processed. In the MMS implementation, the messages are input to the MMSC via an IP network using Hypertext Transfer Protocols (HTTP) or other suitable standard Internet Protocols.

Further, although some of the message processing methods described herein (such as, for example, the method described above with reference to FIG. 7) are described as sequential processing steps, and illustrated as being performed in a specified processing order, it will be appreciated by those skilled in the computing and data processing arts that the described steps may, in other embodiments, be performed in different orders, or in parallel, as is convenient to the system designer. Such modifications in the form and details of the described methods and apparatus may be made without departing from the scope of the present disclosure. These and other variations constitute embodiments of the described message processing methods and apparatus.

Although not required, the present disclosure is described in the general context of computer-executable instructions, such as program modules, being executed by a computer, such as a personal computer. Generally, program modules include routines, programs, objects, components, data structures, etc., that perform particular tasks or implement particular abstract data types.

Those skilled in the message processing and computer arts will appreciate that the present teachings may be practiced with other computer system configurations, including handheld devices, multiprocessor systems, microprocessor-based or programmable consumer electronics, network PCs, minicomputers, mainframe computers, and the like. The disclosure may also be practiced in distributed computing environments where tasks are performed by remote processing devices that are linked through a communications network. In a distributed computing environment, program modules may be located in both local and remote memory storage devices.

The computer may operate in a networked environment using logical connections to one or more remote computers. These logical connections are achieved by a communication device coupled to or a part of the computer. The present disclosure is not limited in this regard to a particular type of communications device. The remote computer may comprise another computer, a server, a router, a network PC, a client, a peer device or other common network node, and typically includes many or all of the elements described above relative to the computer. The logical connections may include a local-area network (LAN) and a wide-area network (WAN). Such networking environments are commonplace in office networks, enterprise-wide computer networks, intranets and the Internet, which are all types of networks.

What is claimed is:

1. A method for processing a message in a wireless communications system for possible message modification to include a selected advertisement message, wherein the message has an associated message size and format, and wherein the wireless communications system comprises a plurality of originating and destination wireless mobile devices, the method comprising the steps of:
    (a) receiving the message, the message being transmitted by an originating device and addressed to a destination device associated with a destination user;
    (b) generating a list of keywords based on at least one of: content of the message, profile information of the destination device, the destination user, and historical information of the destination user;
    (c) matching the list of keywords with a plurality of advertisement messages stored in an advertising message database;
    (d) retrieving one or more advertisement messages based on the match performed in the step (c) for inclusion with the message based on the destination device characteristics, capabilities associated with the destination device and user preferences associated with the destination user;
    (e) computing a net ad value for each of the retrieved advertisement messages, and selecting an advertisement message based on the net ad value; and
    (f) modifying the message to include the selected advertisement message, wherein the size and file format of the message is selectively modified to include the advertisement message, and the modified message is routed to the destination device.

2. The method of claim 1 further comprising ascertaining historical usage information associated with the destination user, and wherein the selection of one of the plurality of advertisement messages is based at least in part upon the destination user's historical usage.

3. The method of claim 1, wherein the message is at least one of a Short Message Service (SMS) message and a Multimedia Messaging Service (MMS) message.

4. The method of claim 1, further comprising the step of forwarding the modified message with the selected advertisement to the destination user.

5. The method of claim 2, wherein the destination user's historical usage information is maintained in a database of previous network access, and wherein the previous network access has an associated and corresponding activity type and keyword.

6. The method of claim 1, wherein each of the one or more advertisement messages have associated and corresponding ad values and ad keywords, and wherein each ad value reflects a value received for delivery of its corresponding advertisement message, and wherein the step (d) of retrieving the one or more advertisement messages comprises the sub-steps of:
    i) assembling a list of keywords associated with the message based upon at least one of contents of the message, the destination user preferences and historical usage, and the destination device characteristics and capabilities;
    ii) comparing the keyword list generated in step i) with the ad keywords;
    iii) retrieving the one or more advertisement messages from the advertising message database having ad keywords matching keywords in the keyword list;
    iv) identifying an advertisement message from the one or more advertisement messages retrieved in step iii) having the highest associated and corresponding ad value; and
    v) selecting the advertisement message.

7. The method of claim 6, wherein the sub-step i) of assembling a list of keywords includes supplementing the keyword list by analyzing the message for occurrence of keywords.

8. The method of claim 6, wherein the list of keywords is generated using one or more of the following types of information: information derived from a statistical analysis of the message; information derived from an analysis of previous purchases made by the destination user; and physical location of the destination device.

9. The method of claim 1, wherein the plurality of advertisement messages each has an associated and corresponding advertisement record defining characteristics of its corresponding advertisement, and wherein the advertisement record includes one or more of the following information: file format, display size, file size, advertisement message content, a plurality of ad keywords, and ad value, and wherein the file format, display and file size provide minimum requirements for delivery and display of the corresponding advertisement, and wherein the ad value comprises a value received for delivery of the corresponding advertisement.

10. The method of claim 8, wherein each advertisement message record in the advertising message database further includes a keyword value associated with and corresponding to each of the ad keywords, and wherein the keyword value represents a value of its corresponding keyword.

11. The method of claim 1, wherein the step (f) of modifying the message to include the selected advertisement message includes at least one of: expanding the message to multiple Short Message Service (SMS) messages; reformatting message text to increase the size of the message; translating the message to a different file format to increase the size of the message; and compressing the message to provide space for the selected advertisement.

12. The method of claim 3, wherein the step (f) further includes transcoding the message from an original single or multiple-fragment SMS messaging format to one of the following messaging formats: single-fragment SMS, multiple-fragment SMS, Enhanced Messaging Services (EMS), and MMS.

13. A message processing apparatus, using in a wireless communications system for possible message modification to include a selected advertisement message, wherein the wireless communications system includes an originating wireless mobile device and a destination wireless mobile device associated with a destination user, and wherein the destination device has an associated and corresponding device profile and the user has an associated and corresponding user profile, wherein the device profile specifies characteristics of the destination device, and wherein the originating device transmits a message addressed to the destination device, and wherein the message processing apparatus processes the message to determine whether or not to combine the message with a selected one of a plurality of advertisement messages, the system comprising:
    (a) a message processing module executed by a computer processor comprising:
        (i) a Message analysis Module (MAM) for: receiving the message transmitted by the originating device and addressed to a destination device associated with the destination user, wherein receiving the message further comprises determining if the message is addressed to a valid user, if the destination user permits reception of advertisement messages, and if the destination device supports the reception and display of the advertisement messages;

(ii) an Advertising Message Selection Module (AMSM) for:

generating a list of keywords based on at least one of: content of the message, profile information of the destination device, the destination user, and historical information of the destination user;

matching the list of keywords with the plurality of advertisement messages stored in an advertising message database;

retrieving one or more advertisement messages based on the match performed for inclusion with the message based upon the device and user profiles and at least one of the following: content and format of the message; content and format of the advertisement messages; historical usage of the destination device; purchasing and network access history associated with the destination user; ad values associated with the delivery of the advertisement messages to the destination user; and characteristics of communication channels used to deliver the message to the destination user; and computing a net ad value for each of the retrieved advertisement messages, and selecting an advertisement message based on the net value; and (iii) a Message Modification Module (MMM) for modifying the message to include the selected advertisement message with the message, and wherein the modified message is forwarded to the destination device.

14. The message processing apparatus of claim 13, wherein the message comprises a Short Message Service (SMS) message.

15. The message processing apparatus of claim 14, wherein the SMS message comprises a single-fragment SMS message.

16. The message processing apparatus of claim 13, wherein the message comprises a Multimedia Messaging Service (MMS) message.

17. The message processing apparatus of claim 13 further comprising a User Profile Database and Device Profile Database, wherein the User Profile Database contains a plurality of profiles associated with and corresponding to one or more current users of the wireless system, and wherein the Device Profile Database contains a plurality of profiles of devices used in the wireless system.

18. The message processing apparatus of claim 13, wherein the message is addressed to the destination user using a telephone number associated With the destination device, and wherein the MAM retrieves the destination user profile from the User Profile Database using the telephone number as an index, and wherein the destination user profile includes information regarding the type of destination device used by the destination user, and permitted messaging protocols allowed by the destination device.

19. The message processing apparatus of claim 13, wherein the MAM retrieves destination device profiles from the Device Profile Database using the destination device type as an index, and wherein, based upon the information contained in the retrieved user and device profiles, the MAM determines if all of the following conditions are met: (a) the destination user is valid; (b) the destination user profile exists; (c) the destination user permits reception of advertisement messages; (d) the destination device type is known, and (e) the destination device supports the reception of the advertisement messages.

20. The message processing apparatus of claim 19, wherein if any one of the conditions (a)-(e) are not met, the MAM immediately forwards the message unaltered for transmission to the destination user; and wherein if all of the conditions (a)-(e) are met, the MAM forwards the message and associated destination user and device profiles to a second processing module for further processing.

21. The message processing apparatus of claim 13, wherein the Advertising Message Selection Module (AMSM) is adapted to receive the message and associated destination user and device profiles, and wherein the message processing apparatus further comprises a User History Database and Advertising Message Database, wherein the User History Database contains a plurality of user history records associated with and corresponding to all current users of the wireless system, and wherein the Advertising Message Database contains a plurality of advertising message records associated with and corresponding to the plurality of advertisements.

22. The message processing apparatus of claim 21, wherein each user history record contains one more of the following information related to the associated and corresponding user: a record type indicative of a type of previous network usage by the associated device, and a user history keyword associated with and corresponding to the previous network usage.

23. The message processing apparatus of claim 22, wherein the user history keyword is generated whenever the associated and corresponding user accesses an Internet web page using the associated mobile device, and wherein the user history keyword is associated with and corresponds to the accessed web page.

24. The message processing apparatus of claim 13, wherein the AMSM receives the message and associated destination user and device profiles, and wherein the AMSM retrieves a user history record, associated with and corresponding to the destination user, from the User History Database, and wherein the AMSM generates a keyword list based upon the message, the destination user and device profiles, and the user history record.

25. A computer program product for use with a computer, the computer program product comprising a computer usable medium having a computer readable program code embodied therein for processing a message in a wireless communications system for possible message modification to include a selected advertisement message, wherein the message has an associated message size and format, and wherein the wireless communications system comprises a plurality of originating and destination wireless mobile devices, the computer readable program code comprising:

(a) instructions for receiving the message, the message being transmitted by an originating device and addressed to a destination device associated with a destination user;

(b) instructions for generating a list of keywords based on at least one of content of the message, profile information of the destination device, the destination user, and historical information of the destination user;
(c) instructions for matching the list of keywords with a plurality of advertisement messages stored in an advertising message database;
(d) instructions for retrieving one or more advertisement messages based on the match performed in step (c) for inclusion with the message based on the destination device characteristics and capabilities and the destination user preferences;
(e) instructions for computing a net ad value for each of the retrieved advertisement messages, and selecting an advertisement message based on the net value; and
(f) instructions for modifying the message to include the selected advertisement message, wherein the size and file format of the message is selectively modified to include the advertisement, and the modified message is routed to the destination device.

* * * * *